United States Patent [19]
Bakke et al.

[11] Patent Number: 5,566,170
[45] Date of Patent: Oct. 15, 1996

[54] METHOD AND APPARATUS FOR ACCELERATED PACKET FORWARDING

[75] Inventors: Mark A. Bakke, Maple Grove; Edward J. Fiore, Ramsey, both of Minn.

[73] Assignee: Storage Technology Corporation, Louisville, Colo.

[21] Appl. No.: 366,221

[22] Filed: Dec. 29, 1994

[51] Int. Cl.$^6$ .......................... H04L 12/56; G06F 13/00
[52] U.S. Cl. ........................ 370/60; 370/94.2; 395/650; 395/800
[58] Field of Search ................... 370/58.1, 58.2, 370/58.3, 60, 60.1, 61, 79.82, 83, 85.13, 85.14, 94.1, 94.2, 94.3, 99; 395/200, 325, 375, 650, 800

[56] References Cited

U.S. PATENT DOCUMENTS

| | | | |
|---|---|---|---|
| 5,134,610 | 7/1992 | Shand et al. | 370/60 |
| 5,249,292 | 9/1993 | Chiappa | 395/650 |
| 5,278,834 | 1/1994 | Mazzola | 370/94.1 |
| 5,280,476 | 1/1994 | Kojima et al. | 370/60.1 |
| 5,414,702 | 5/1995 | Kudoh | 370/60 |
| 5,414,707 | 5/1995 | Johnston et al. | 370/79 |
| 5,430,709 | 7/1995 | Galloway | 370/13 |

*Primary Examiner*—Alpus H. Hsu
*Attorney, Agent, or Firm*—Patterson and Keough

[57] ABSTRACT

A method and apparatus are provided to transfer protocol data units within a communication network. This transferring is accomplished with a protocol data unit preprocessor utilized in a protocol data unit forwarding device that is operated in the communication network. The preprocessor includes an identification mechanism which determines media header information of a protocol data unit received from over the communication network. Subsequently, a validation mechanism validates the media header information. In addition, modification mechanism adds next operation information to the media header information based upon the determined media header information such that subsequent processing of the protocol data unit by the protocol data unit forwarding device is reduced.

29 Claims, 6 Drawing Sheets

METHOD AND APPARATUS FOR ACCELERATED PACKET FORWARDING

RELATED INVENTIONS

The present invention is related to:

Co-pending U.S. patent application Ser. No. 08/366,225 filed on Dec. 23, 1994, which is entitled "Method And Apparatus For Accelerated Packet Processing" by Geof Stone, Co-pending U.S. patent application Ser. No. 08/366,226 filed on Dec. 23, 1994, which is entitled "Method And Apparatus For Radix Decision Packet Processing" by Geof Stone, Co-pending U.S. patent application Ser. No. 08/366,227 filed on Dec. 23, 1994, which is entitled "Method And Apparatus For Virtual Switching" by Ken Hardwick, et al.;

and which were all filed concurrently herewith and assigned to the assignee of the present invention.

FIELD OF THE INVENTION

The present invention relates generally to data communication networks. More particularly, the present invention relates to protocol data unit forwarding systems that direct the flow of protocol data units in the data communication networks.

BACKGROUND OF THE INVENTION

In a data communication network, a forwarding device (e.g., a data packet switch) directs protocol data units (e.g., data packets) from one network node to another. These data packets may include voice, video, or data information as well as any combination thereof.

To better understand how forwarding devices work within a data communication network, an analogy may be helpful. In many respects, data communication networks are similar to postal delivery systems, with pieces of mail, such as letters or packages, being comparable to the data packets which are transferred within a data communication network. In a postal delivery system, the pieces of mail may be input into the postal delivery system in a variety of ways. Once within the postal delivery system, all of the pieces of mail are collected and transported to nearby processing facilities where the pieces of mail are sorted for further processing. Although each piece of mail will have a unique delivery address, most of the pieces of mail are automatically sorted by a shorter zip code or some other type of routing code. Letters without zip codes must be sorted and processed by hand. Some postal delivery systems also have special forms of encoded delivery addresses, such as Post Office box numbers at a Post Office, which are not recognizable by other postal delivery systems such as Federal Express or United Parcel Service. Regardless of which particular postal delivery system the piece of mail is deposited into, once the mail has been sorted by destination it is routed through additional intermediary processing facilities until it arrives at the local indicated by the destination on the piece of mail. At this point, the zip code or routing code is no longer sufficient to deliver the piece of mail to the intended destination and the local delivery office must further decode the destination address in order to deliver the piece of mail to the intended recipient. In addition to processing pieces of mail for routing the mail to the correct destination, the pieces of mail may go on through several other processing steps. For example, if the piece of mail is going out of the country, it must go through a customs operation in each country. If the national postal delivery system is being used to deliver the piece of mail then it must also be transferred from one national postal delivery system to another. In a private postal delivery system however, this transfer step would not be necessary. The pieces of mail may also be monitored or filtered for such things as mail fraud violation or shipment of hazardous materials.

Data packets are manipulated in a data communication network in a manner similar to that by which pieces of mail are delivered in a postal delivery system. Data packets, for example, are generated by many different types of devices and are placed onto a communication network. Typically, the data packets are concentrated into a forwarding device, such as a local bridge or router, and are then directed by destination over one or more media types (e.g., fiber optic) which are connected to destination devices that could be other larger or smaller bridges or routers. These destination devices then deliver the data packet to its terminal end point (i.e., the end user). Along the way the data communication network may perform filtering and monitoring functions with respect to the data packets.

Just like postal delivery systems have experienced ever increasing volumes of mail which must be delivered, the volume of protocol data units being transferred across computer networks continues to increase as experience is being gained with this new form of communication delivery system and as more and more applications, with more and more expansive means are being developed. In addition, quickly changing technology has made the underlying data transmission resources for computer communication networks relatively inexpensive. Fiber optics, for example, offer data transfer rates in the gigabyte per second range.

The capability or through put of a forwarding device and a computer communication network can be measured either by the number of data packets per second or by the number of bits per second which pass through the forwarding device. The former measure is important because in typical network traffic, the bulk of protocol data units or data packets are small and the critical parameter is how many data packets a forwarding device can handle. If network traffic is weighted by packet size, however, the bulk of the data is carried in large packets. In large bulk data transfers, the second measure of how many bits are being transferred is more important regardless of the number of data packets that are handled. This tension between packet transfer rate versus bit transfer rate is a continuing dichotomy in through put measurements of forwarding devices. Regardless of which through put measure is used, there is a need for through put rates that are substantially higher than the through put rates currently available in forwarding devices.

The existing types of forwarding devices which offer the greatest potential to meet the increasing demand on through put rates are packet switches. Several classes of packet switches exist. Each class differs substantially from the other class of devices, but all may be commonly referred to as packet switches or forwarding devices.

A first class of packet switches is that commonly used in digital telephone exchanges. By analogy, these switches can perform the functions only of a mail carrier picking up and delivering mail along a single route. These switches are intended only to transfer packets among the devices in a single station, such as a telephone exchange. The format of the packet in these systems is chosen to make the hardware in the switch as simple as possible; and this usually means that the packets include fields designed for direct use by the hardware. The capabilities of this class of switches (for example, in such areas as congestion control) are very limited in order to keep the hardware simple.

A second class of packet switches is used in smaller or restricted computer networks, such as X.25 networks. By analogy, these switches are equivalent to the Post Office in a single town with no connection to other Post Offices. In some sense, these switches are little different from the first class of packet switches described above, but there is one substantial difference. The format of the packets (that is, the protocols) handled by the second class of packet switches is much more complex. This greater complexity is necessary because the protocols are designed to work in less restricted environments, and because the packet switches must provide a greater range of services. While the formats interpreted by the first class of switches are chosen for easy implementation in hardware, the data packets handled by this second class of switches are generally intended to be interpreted by software (which can easily and economically handle the greater complexity) and provides the inherit benefit of incremental flexibility in the design of the packet switch.

In a third class of packet switches, the packet protocols are intended to be used in very large data networks having many very dissimilar links (such as a mix of very high speed local area networks (LANs) and low speed long distance point to point lines). Examples of such protocols are the United States designed Transmission Control Protocol/Internetwork Program (TCP/IP), and the International Standards Organization's Internetworking Protocol/Connectionless Network Service (IP/CLNS) protocols.

In addition, this third class of switches (commonly referred to as bridge/routers) often must handle multiple protocols simultaneously. This third class of switches is very similar to the mail processing devices used in the modern postal system. Just as there are many countries, there are many data packet protocols used in computer networks. While a single postal system was once thought to be sufficient to handle mail going anywhere in the world, today several competing systems like United Parcel Service, Federal Express, and the U.S. Postal Service exist to handle the special needs of mail going to every country, state, city, town, and street in the world. Similarly, in computer communication systems, the packet switches are more involved in the carrying of data, and must understand some of the details of each protocol to be able to correctly handle data packets which are being conveyed in that protocol. The routers in this third class of packet switches often have to make fairly complex changes to the data packets as they pass through the packet switch.

It is this latter class of packet switches to which the following detailed description primarily relates. It will be appreciated however, that the detailed description of this invention can readily be applied to the first and second class of switches as well. In current conventional packet switch design, a programmed general purpose processor examines each data packet as it arrives over the network interface and then processes that packet. Packet processing requires assignment of the data packet to an outbound network interface for transmission over the next communications link in the data path. While attempts are being made to build higher speed packet switches, based on this architecture of using general purpose processors, the attempts have not been very successful. One approach is to use faster processors, another is to make the software run faster, and a third is to apply multiple processors to the processing task. All of these approaches fail to meet the increasing performance demands for packet switches for the reasons noted below.

The approach which uses faster processors simply keeps pace with processor dependent (future) demands because the traffic which the packet switch will handle will depend upon the speed of the user processors being used to generate the traffic. Those user processors, like the processors in the packet switches, will increase in speed at more or less the same rate. Accordingly, there is no overall increase in the ability of the future packet switch over present packet switches, relative to traffic load. Furthermore, this approach may be impractical as not being cost-effective for widespread use. For example, two high speed machines, distant from each other, must have intermediate switches which are all equally as powerful; deployment on a large scale of such expensive switches is not likely to be practicable.

The approach which increases the execution rate of the software itself by, for example, removing excess instructions or writing the code in assembly language, leads to a limit beyond which an increase in performance cannot be made. The gains which result are typically small (a few percent) and the engineering costs of such distortions in the software are significant in the long term. This type of assembly code optimization restricts the ability to enhance the software as well as port the software to a different processor platform.

The use of multiple processors to avoid the "processor bottleneck" provides some gains but again has limits. Given a code path to forward a data packet, it is not plausible to split that path into more than a few stages. Typically these stages would involve network input, protocol functions, and network output. The basis for this limitation is the overhead incurred to interface the different processors beyond a limited number of task divisions. That is, after a certain point, the increase in interface overhead outweighs the savings obtained from the additional stage. This is particularly true because of the need to tightly integrate the various components; for example, congestion control at the protocol level requires dose coordination with the output device. Also, the interface overhead costs are made more severe by the complication of the interface which is required.

In general then, the multiprocessor approach is not the answer to substantially increasing the throughput of the packet switching network. This has been borne out by several attempts by technically well-regarded groups to build packet switches using this approach. While aggregate throughput over a large number of interfaces can be obtained, this is, in reality, little different than having a large number of small switches. It has thus far proven implausible to substantially speed up a single stream using the multiprocessing approach.

A need still exists for an improved protocol data unit (i.e., frame, cell, or packet) forwarding system which solves the above-mentioned problems in a manner which can better handle large numbers of input streams, large numbers of output destinations and lines, many different types of communication protocols, and large and small data packets at both high bit throughput rates and high packet throughput rates, while maintaining reasonable costs and complexity.

SUMMARY OF THE INVENTION

The present invention provides a packet forwarding system with improved throughput performance by means of a method and apparatus for accelerated packet forwarding. In accordance with a first aspect of the invention, a protocol data unit preprocessor is used in a protocol data unit forwarding device utilized in a communication network to transfer protocol data units within the communication network. The preprocessor includes an identifier which determines media header information of a protocol data unit received from over the communication network. In addition, the validation mechanism is operatively coupled to the identifier to validate the media header information. Also, a modifier device is operatively coupled to the identifier to perform necessary modifications to the media header (e.g., add next operation information) based upon the determined media header information such that subsequent processing of the protocol data unit by the protocol data unit forwarding device is reduced.

With reference to the postal delivery analogy, the present invention can be likened to a system which both increases the speed at which pieces of mail can be moved through the postal delivery system and provides an ability to handle in a common system pieces of mail entered into a variety of different postal delivery systems. By utilizing the preprocessor of the present invention to identify and verify the media header or address information of a protocol data unit and then using this information to generate a modified address that facilitates quicker processing of the protocol data units, the present invention is able to significantly increase the through put of the forwarding device, both in terms of the number of data packets per second and in terms of the number of bits per second which pass through the forwarding device.

The media header information typically includes at a minimum the encapsulation type, protocol type, frame type, media destination, and source route information. This information is used by the modifier device to add next operation information which specifies a particular operation such as route, bridge, or source route bridge to perform on the received protocol data unit. It should be noted that a media destination may be multicast, a unicast match, or a unicast non-match destination.

In order to accelerate the forwarding of a received protocol data unit, the identifier preferably is configured to determine the media header information after having received only a portion (i.e., the first several bits or bytes) of the protocol data unit. Similarly, the modifier device preferably is configured to modify the media header after having received only a portion of the protocol data unit. Both of these optimizations are particularly important when manipulating large protocol data units which extend over several frames or consist of several smaller parts that are received at various times and/or from various incoming interfaces.

In accordance with a second aspect of the invention, a method of operating a forwarding device within a communication network is provided to forward a protocol data unit received by the forwarding device. This method is performed by device-implemented steps in a first and second processor. In the first processor, media header information of a protocol data unit is determined based upon a portion of the protocol data unit which is received from over a communication network, the media header information is validated, and next operation information is added to the media header information based upon the determined media header information such that subsequent processing of the protocol data unit by a forwarding processor is reduced. In a second processor, the protocol data unit is forwarded based upon the next operation information.

The validating step preferably consists of performing one or more validation schemes. These validation schemes include, but are not limited to, time to live, hop count, checksum, header type, header version, network header length, check options, source route header length, and check for duplicate local area network identifiers. In conjunction with using these validation schemes, a step may be added to the preferred embodiment method prior to the step of forwarding the protocol data unit. This additional step would involve modifying the protocol data unit in accordance with next operation information by decrementing a time to live, incrementing a hop count, modifying a checksum, truncating a protocol data unit, and/or removing a frame check sequence from the protocol data unit. In addition, it may be necessary to pad bytes of data to the protocol data unit to enhance the forwarding process such that the header information is aligned on optimal boundaries.

These and various other features as well as advantages which characterize the present invention will be apparent upon reading of the following detailed description and review of the associated drawings.

DETAILED DESCRIPTION OF THE PREFERRED EMBODIMENT

Figure 1:
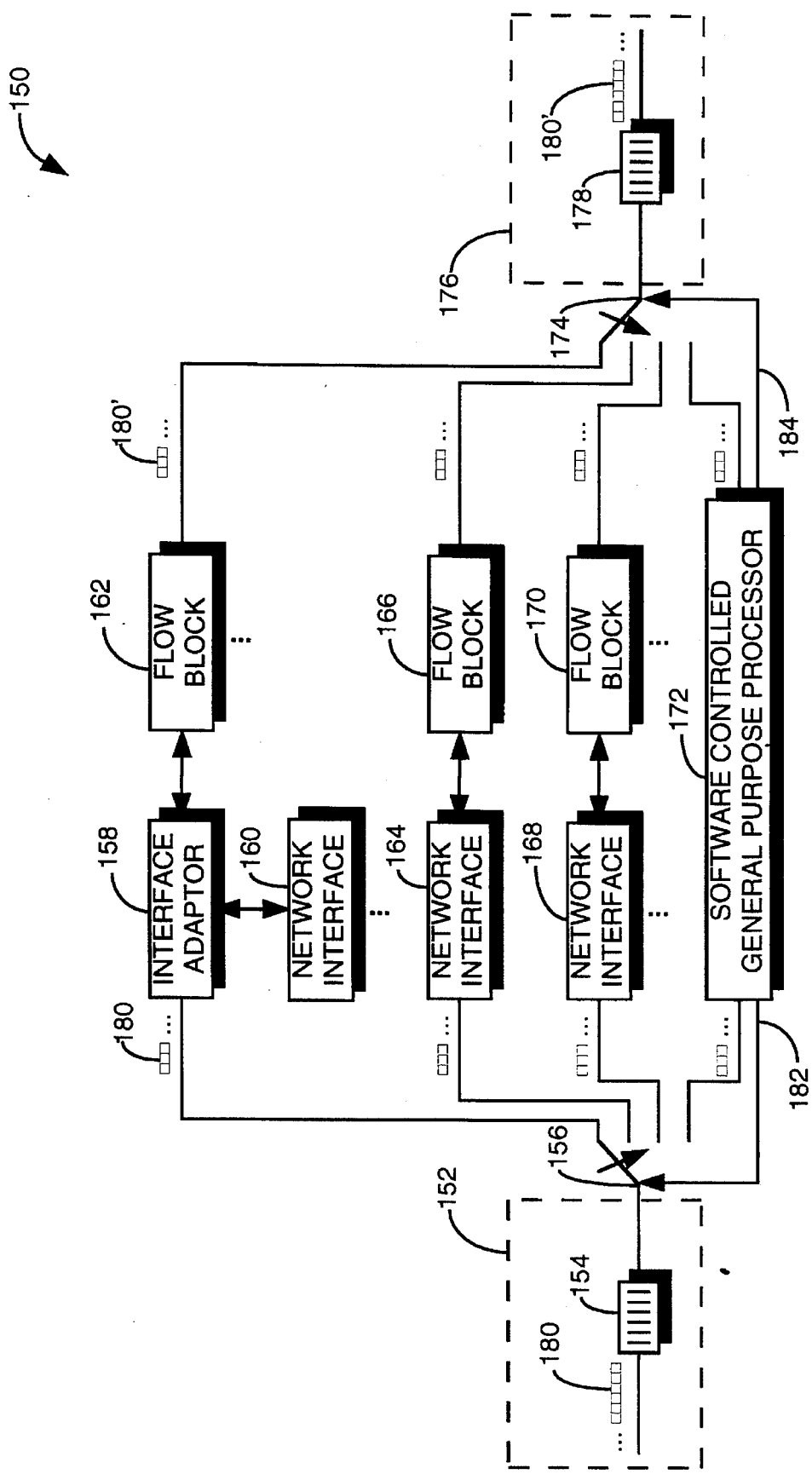
FIG. 1 is a block diagram of a prior art network device.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller machine transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed. The user is unaware of any of this, of course, but in fact that's what's happening while the words, "Please wait, your transaction is being processed" appears on the screen.

The ISO has specifically defined all seven layers, which are summarized below in the order in which the data actually flow as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems (i.e., layer 4 at the destination "confirms the request for a connection," so to speak, that it has received from layer 4 at the source).

Layer 3, the network layer, provides routing and relaying of data through the network (among other things, at layer 3 on the outbound side an "address" gets slapped on the "envelope" which is then read by layer 3 at the destination).

Layer 2, the data link layer, includes flow control of data as they pass down through this layer in one open system and up through the peer layer in the other open system.

Layer 1, the physical interface layer, includes the ways in which data communications equipment is connected mechanically and electrically, and the means by which the data move across those physical connections from layer 1 at the source to layer 1 at the destination.

Shown in FIG. 1, is a prior art network device 150 described in U.S. Pat. No. 5,249,292 issued Sep. 28, 1993 to J. Noel Chiappa. The Chiappa '292 patent describes a data packet switch 150 that operates at OSI layers 1 through 3 which provides a solution to many of the previously-mentioned problems. The Chiappa '292 patent discloses a high speed data packet switching circuit which has a software controlled primary processing unit 172 (i.e., a general purpose processor) and a plurality of network interface units 160, 164, and 168 each connected to an input network 152 (i.e., inbound interface) for receiving incoming data packet streams as well as an output network 176 (i.e., outbound interface) for transmitting outgoing data packet streams for that network. It should be noted that a single input and output network are described by the Chiappa '292 patent.

The input network 152 includes a data byte buffer 154 which temporarily stores portions of incoming data packet streams for the the primary processing unit 172 to subsequently analyze or switch to a network interface unit. Similarly, the output network 176 includes a buffer 178 for storing data bytes until the primary processing unit 172 releases modified data packets as an outgoing data packet stream 180' for transmission on the output network. Two types of network interface units are taught by the Chiappa '292 patent. The first type is a general purpose network interface 160 which merely performs the network layer functions and a separate interface adaptor 158 which performs data link layer functions such as flow control for data bytes coming from a specific type of physical interface layer device. The second type of network interface unit is a special purpose network interface 164 which combines the functions of the general purpose network interface 160 and interface adaptor 158 into a single device.

In addition, a plurality of high speed data stream hardware control circuits 162, 166, and 170 (i.e., flow blocks) are provided for processing data packets in response to instructions for the primary processing unit 172. For example, data packet 180 of one data stream is assigned to flow block 162 and passes through interface adaptor 158 while being manipulated by network interface 160. Data packet 180 is modified by flow block 162 into modified data packet 180' prior to transmission on an outbound network.

Also, circuitry 156 and 174 (a multiplexer and a demultiplexer, respectively) is included for interconnecting the primary processing unit 172, the interface units 160, 164, and 168 and the data stream control circuits 162, 166, and 170. The primary processing unit 172 receives, from the input network 152, at least a first one of the data packets 180 of each new data packet stream and assigns, by way of control lines 182 and 184 to circuitry 156 and 158, respectively, that stream to be processed by one of the data stream control circuits 162 without further processing by the primary processing unit 172. When a user desires to handle more data streams simulataneously, more flow blocks and network interfaces are added for the primary processing unit 172 to which incoming data streams are switched. The Chiappa '292 patent thus performs routine, repetitive processing steps on the further packets of the data stream using high speed hardware circuitry 162, while the initial processing and other non-repetitive or special processing of the data packets are performed in software.

Unfortunately, the Chiappa '292 patent as well as the software-based solutions on general purpose microprocessors do not completely solve the "processor bottleneck" problem (i.e., primary processing unit 172 must still analyze each data stream at least once) and as a result a need still exists for an improved protocol data unit (i.e., frame, cell, or packet) forwarding system which solves this problem, as well as others, in a manner which can better handle large numbers of input streams from one or more networks, large numbers of output destinations and lines, and large and small data packets at both high bit throughput rates and high packet throughput rates, while maintaining reasonable costs and complexity.

Figure 2:
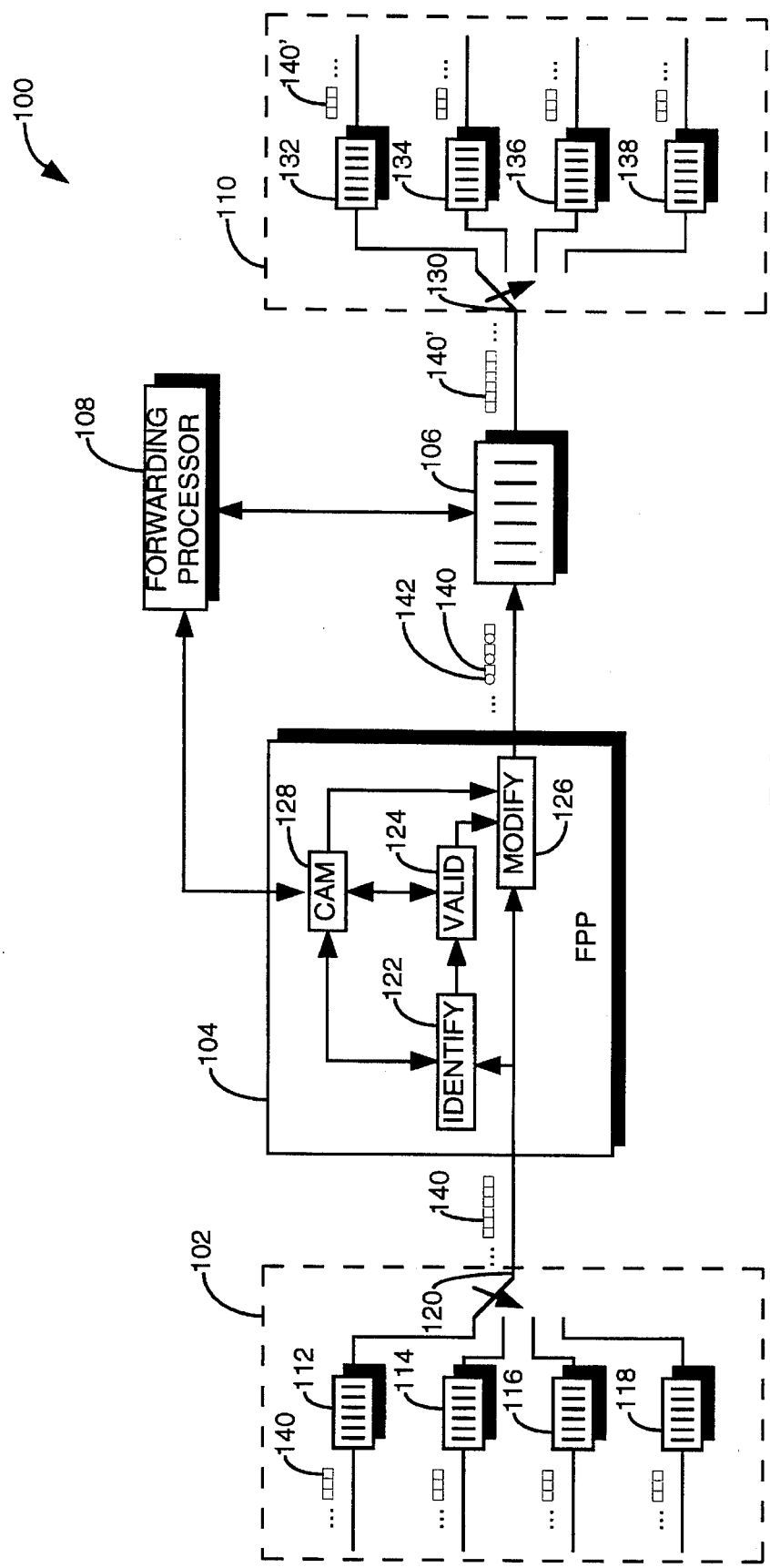
FIG. 2 is a block diagram of a preferred embodiment network device in accordance with the present invention.

Referring to FIG. 2, a preferred embodiment of a forwarding system in which a protocol data unit preprocessor 104 (also termed a fast packet processor (FPP)) is used in a protocol data unit forwarding device 100 that operates in a communication network to transfer protocol data units (e.g., 140) within the communication network. The forwarding device 100 manipulates bits of information preferably at the OSI network, link and physical layers, but can manipulate bits of information at all levels, and preferably performs as one or more network devices including, but not limited to, a bridge, a router, a switch, an inline filter, a protocol converter, an encapsulating device, and a security device. It will be appreciated that various types of communication networks exist which utilize forwarding devices that perform these functions including local protocol data unit source devices (e.g., desktop computers or workstations), local area networks, wide area networks, metropolitan area networks, and wireless networks. It will be appreciated by those skilled in the art that the forwarding device 100 may perform other network-based functions without departing from the scope and spirit of the present invention. In addition, other types of data in the communication network could readily be manipulated by the forwarding device 100, such as voice and video.

The forwarding device 100 includes an inbound interface 102 and outbound interface 110 which control the flow of protocol data units 140 and 140' into and out of the forwarding device 100, respectively. These interfaces 102 and 110 are configured differently depending on the type of communication network that the forwarding device 100 is connected to as well as the particular location within such a network that the forwarding device 100 is located.

For example, inbound interface 102 may include several memory buffers 112, 114, 116, and 118 which receive bits of information from several different network devices which are communicating bits of information on several types of OSI physical layer media (e.g., fiber optics, coaxial cable, or twisted pair wires) while using various types of OSI link layer signaling protocols (e.g., Fiber Distributed Data Interchange (FDDI) or ethernet) and various types of OSI network layer protocols (e.g., TCP/IP or DECnet). These network devices could be other forwarding devices or end user devices (e.g., computers, digital phones, or the like). The bits of information from the memory buffers 112, 114, 116, and 118 are combined together into a single stream of data bytes by a demultiplexer 120 to form packets or cells. The demultiplexer 120 preferably combines the bytes of information of these packets or cells by periodically clocking information out of the memory buffers 112, 114, 116, and 118. In a similar manner, the outbound interface 110 includes a multiplexer 130 which periodically clocks bits of information (i.e., protocol data units 140') out of memory buffer 106 to appropriate memory buffers 132, 134, 136, and 138 which are connected to outbound lines to the communication network. Alternatively, the inbound interface 102 and/or outbound interface 110 may consist of a single memory buffer and as such multiplexer/demultiplexer would not be needed in the forwarding device 100.

The preprocessor 104 includes an identifier 122 which determines media header information of a protocol data unit received from over the communication network. The identifier 122 preferably analyzes the inbound stream of data bits from the inbound interface 102 to find media header information of a protocol data unit 140 received from over the communication network. In addition, a validation mechanism 124 is operatively coupled to the identifier 122 to validate the media header information. Also, a modifier device 126 is operatively coupled to the identifier 122 to add next operation information 142 to the media header information based upon the determined media header information such that subsequent processing of the protocol data unit 140 by a protocol data unit forwarding processor 108 is reduced. The modified media header information 142 along with the remaining portion of this particular protocol data unit 140 are then stored in a memory buffer 106 until the forwarding processor 108 is able to process this particular protocol data unit. The forwarding processor 108 is operatively coupled to the preprocessor 104 and the memory buffer 106 to forward the protocol data unit 140' without the modified media header information 142 in the communication network based upon the next operation information. It should be noted that the next operation information may include header modification or truncation of the protocol data unit 140 prior to forwarding. The memory buffer 106 works in conjunction with the forwarding processor 108 and the outbound interface 110 to accomplish this task as preferably as a real-time operation.

The media header information typically includes at a minimum the encapsulation type, protocol type, frame type, media destination, and source route information. This information is used by the modifier device 126 to add next operation information 142 which specifies a particular operation such as route, bridge, or source route bridge to perform on the received protocol data unit. It should be noted that a media destination may be multicast, a unicast match, or a unicast non-match destination.

In order to accelerate the forwarding of a received protocol data unit 140, the identifier 122 preferably is configured to determine the media header information after having received only a portion (i.e., the first several bits or bytes) of the protocol data unit 140. Similarly, the modifier device 126 preferably is configured to add next operation information 142 to the media header information after having received only a portion of the protocol data unit 140. Both of these optimizations are particularly important when manipulating large protocol data units which are simultaneously received from various incoming interfaces 102.

The preprocessor 104 preferably includes a mechanism for aligning the contents of buffer memory 106. This can be accomplished by the modifier device 126 padding bytes of data to the protocol data unit 140 such that the header information is aligned on optimal boundaries. The reasons for doing this optimal boundary alignment are discussed in the following sections.

The preprocessor 104 identifier 122 preferably includes an address lookup mechanism for obtaining various addresses required by the preprocessor 104 through the use of a content addressable memory 128 (CAM) located in the forwarding processor 108. The addresses can be obtained through several types of algorithms. For example, a network destination address of the protocol data unit 140 can be compared to a predetermined list of known network destination addresses. Also, a media destination address of the protocol data unit 140 can be compared to a predetermined list of known media destination addresses. Further, a media source address of the protocol data unit 140 can be compared to a predetermined list of known media destination addresses. Furthermore, a media source address of the protocol data unit 140 can be compared to a predetermined list of known media source addresses.

The preprocessor 104 identifier 122 also preferably includes a source route bridge destination lookup mechanism for checking for specifically routed protocol data unit 140, finding next local area network identifier in a source route of the protocol data unit 140, and comparing the next local area network identifier to a predetermined list of known local area network identifiers by utilizing the CAM 128.

Figure 3:
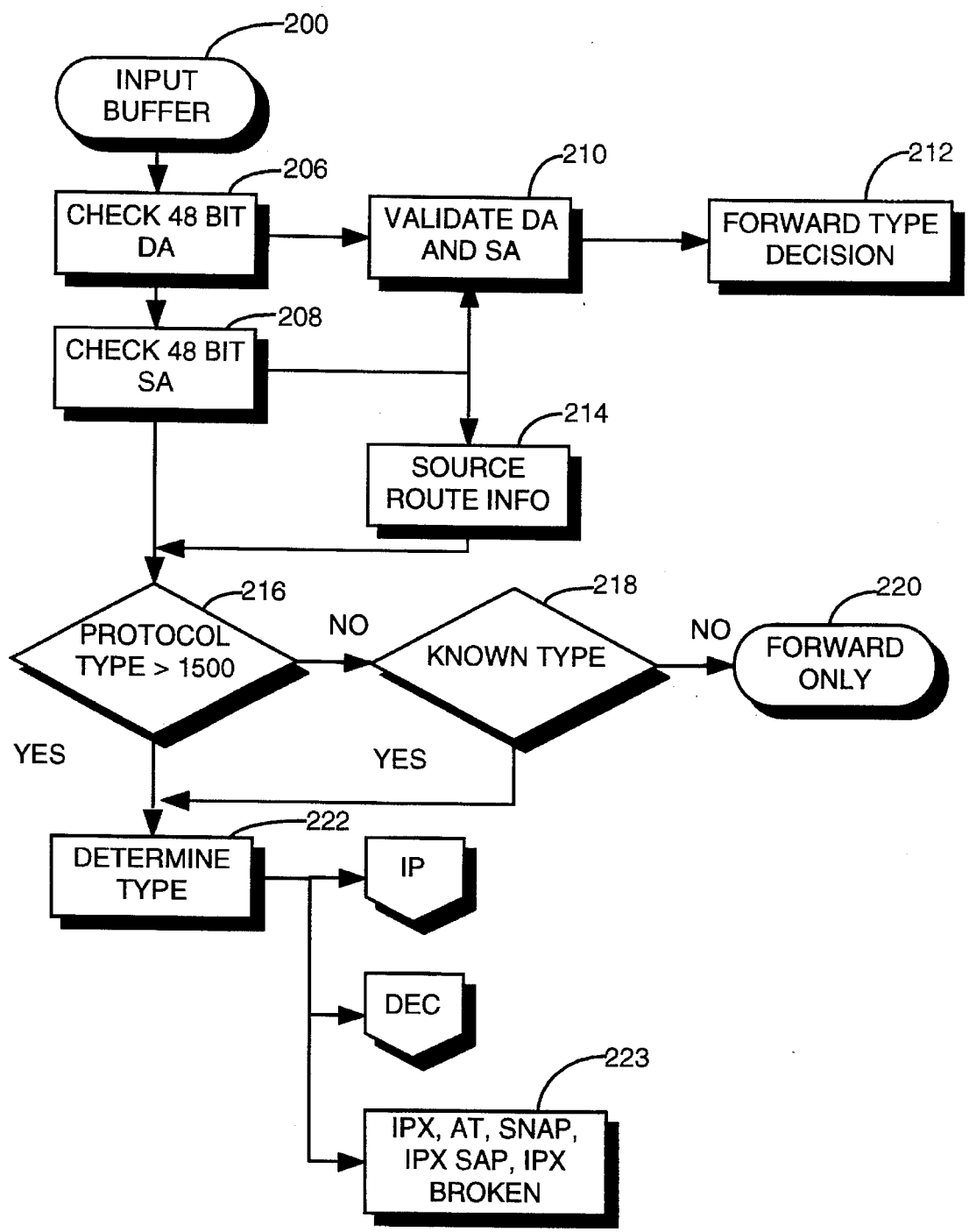
FIGS. 3, 4, and 5 are block diagrams of an operational example of the preferred embodiment network device shown in FIG. 2.
Figure 4:
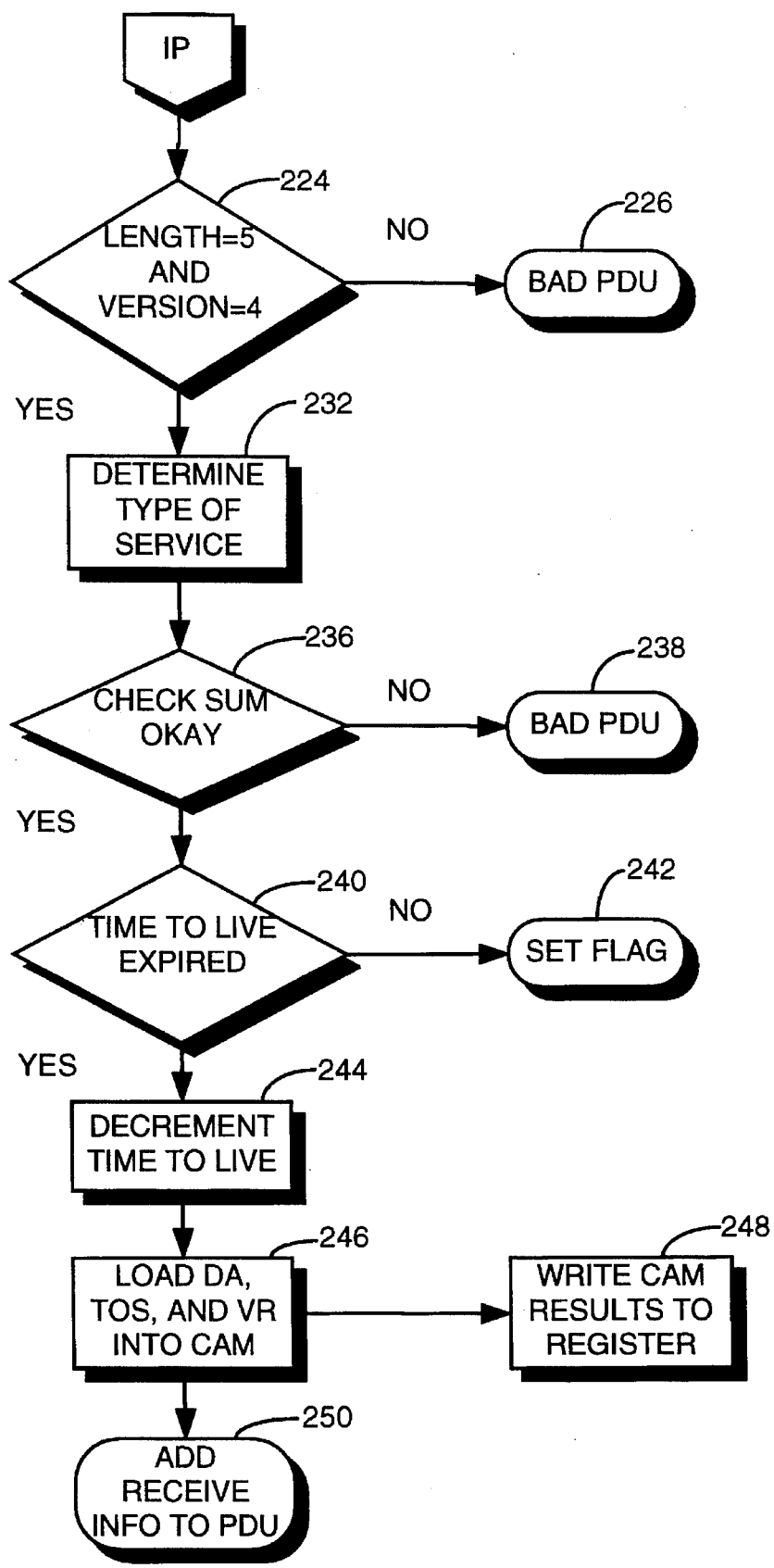

Turning now to FIGS. 3, and 4, an operational example of how the preferred embodiment forwarding device 100 modifies a protocol data unit 140 in an ethernet formatted frame using an Internetworking Protocol (IP) is shown. The FPP 104 either uses the buffering provided by the inbound interface 102 or includes it's own buffer 200 which buffers bytes of information while attempting to identify a protocol data unit 140. The 48 bit destination address (DA) 206 and 48 bit source address (SA) 208 are located in the protocol data unit. Once located, the DA is checked 206 for being multicast and a port identifier is added 206. In addition, the SA is checked 208 for source route information (i.e., RII bit) and a port identifier is added 208. The SA and DA are validated 210 with the CAM and if SA and DA are the same, then a register is set 212, a forward type decision (e.g., bridge, route, or source route bridge) is made 212, and an output register is written 212.

If source route information is located, then it is validated 214 and the Ethertype or protocol type is compared 216 to a predetermined value of 1500 (hex). Otherwise, when no source route information is located, the comparison 216 is done immediately. If the protocol type is not more than 1500 (hex), then it is compared 218 to other values to determine if it is a value which the forwarding system can manipulate. (e.g., Appletalk, Service Network Access Point (SNAP), IPX Service Access Point (SAP), or IPX broken protocol.) If it is not, the protocol data unit is passed 220 through the forwarding system without modification as a forward only protocol data unit, which can be bridged or source route bridged. Otherwise if the protocol type is greater than 1500 (hex), the protocol type is further compared 222 to specific values to determine if it is an IP, DECnet, Internetwork Packet Exchange (IPX), Appletalk, Service Network Access Point (SNAP), IPX Service Access Point (SAP), or IPX broken protocol. If the protocol type is DECnet, operations continue as shown on FIG. 5 which will be discussed in a following section. Otherwise, if it is an IP protocol type, then operations continue as shown in FIG. 4 with block element 224. Similarly, the other protocols can be handled 223 by other specially designed protocol handlers.

For IP protocol types, bits (0–3) describe the IP header length and other bits (4–7) determine the version of IP used. If the IP version is not 4 or the length is less than 5, then a bad frame (protocol data unit) is marked 226. If the IP version is 4 and the length is 5, then no options exist. Otherwise if the IP version is 4 and the length is greater than 5 an option bit needs to be set 224.

Subsequently, a type of service (TOS) is located 232 and optionally added 234 to the CAM lookup. In addition, check sum bits are checked 236 and a check sum bit OK is set or the bad frame is marked 238. A time to live bit is checked 240 for expiration and decremented 244. If the time to live field is less than 2, then a flag is set 242; otherwise operations continue by checking the IP address. Several bits of information, including the DA, virtual router (VR) bits and TOS, are loaded 246. The CAM result is stored 248 in an output register. Finally, receive information (i.e., next operation information) is added 250 to the protocol data unit.

Figure 5:
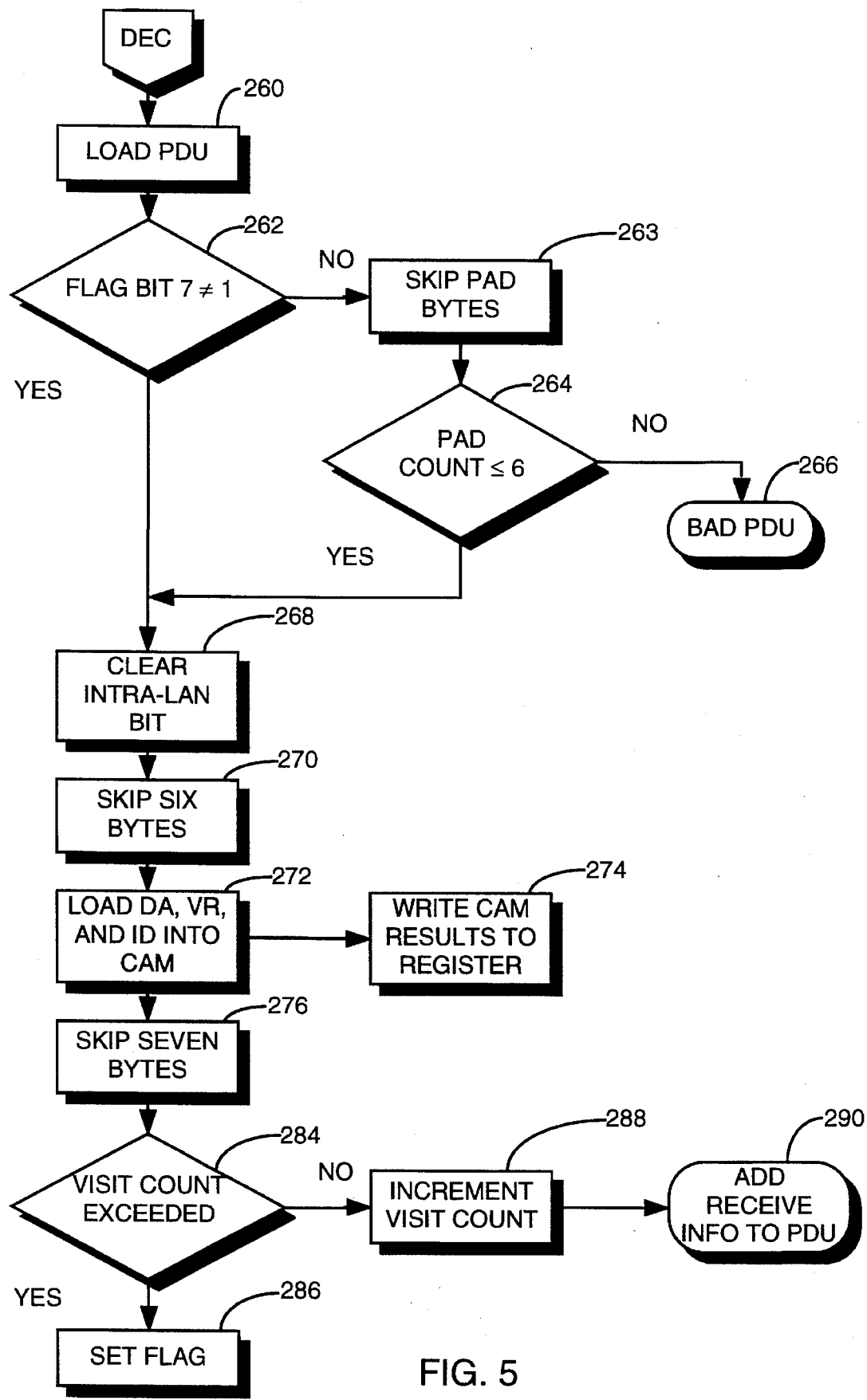

In another example shown in FIG. 5, the operations 200–258 of the forwarding system are similar to those shown in FIGS. 3 and 4, except that operations 224 through 250 are replaced by the following operations 260–290 for a DECnet protocol type. The length of the frame is loaded 260. A flag bit 7 is checked 262 for being a 1. If the flag bit is 1, then the bytes are skipped 263 until a zero byte is found and the number of padded bytes are counted 264. If less than 7 byte are padded, the frame is marked 266 as bad and no further operation on the protocol data unit are performed. Otherwise, if more than 6 bytes are padded or if bit 7 of the flags is not 1, operations continue by clearing the intra-LAN bit 268. Subsequently, the following 6 bytes of information are skipped 270. The following 16 bits are loaded 272 into the CAM as the DA, virtual router bits added, and 5 bits of protocol identification (ID) added. The CAM result is stored 274 in an output register. Subsequently, an additional 7 bytes of information are skipped 276. Then, the visit count is checked 284 to see if it has exceeded some predetermined limit (e.g., less than FF (hex)). If the visit count is exceeded, then a flag is set 286. Otherwise, the visit count is incremented 288 and receive information (i.e., next operation information) is added 290 to the protocol data unit.

Figure 6:
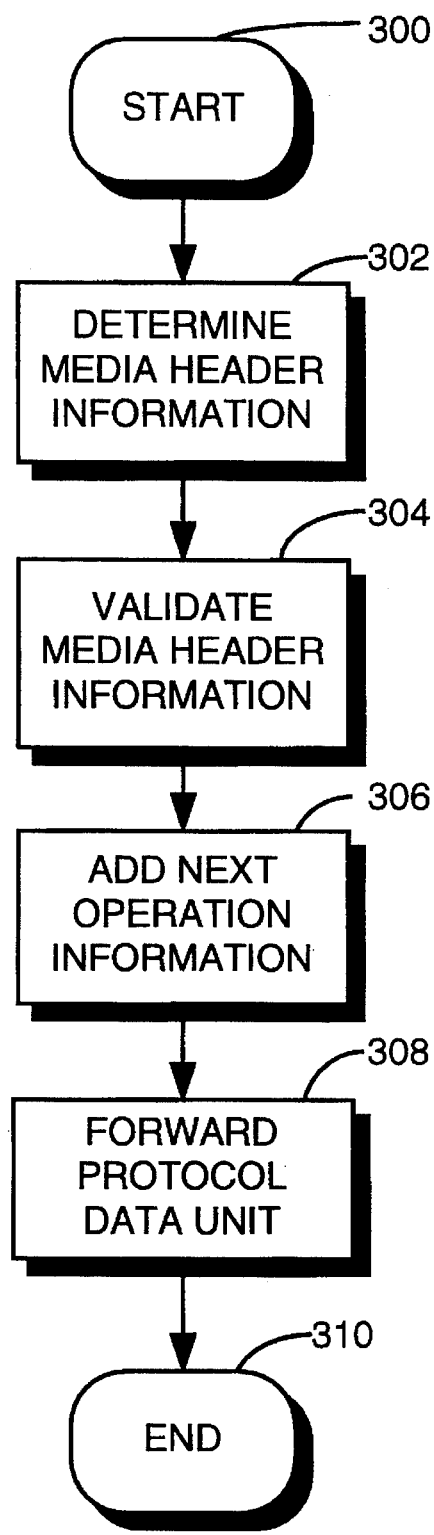
FIG. 6 is a flowchart of the preferred embodiment operations of the network device shown in FIG. 2 in accordance with the present invention.

The preferred embodiment method of operating the forwarding device 100 can be summarized in reference to the flowchart shown in FIG. 6. This method 300–310 is performed by device-implemented steps in a first and second processor. In the first processor, media header information of a protocol data unit is determined 302 based upon a portion of the protocol data unit which is received from over a communication network, the media header information is validated 304, and next operation information is added 306 to the media header information (i.e., the media header information is modified to include the information) based upon the determined media header information such that subsequent processing of the protocol data unit by a forwarding processor is reduced. In a second processor, the protocol data unit is forwarded 308 based upon the next operation information.

The validating step 304 preferably consists of performing one or more validation schemes. These validation schemes include, but are not limited to, time to live, hop count, checksum, header type, header version, network header length, check options, source route header length, and check for duplicate local area network identifiers. In conjunction with using these validation schemes, a step may be added to the preferred embodiment method prior to the step of forwarding the protocol data unit or it simply is combined with the existing modifying operations 306. This additional step would involve modifying the protocol data unit in accordance with next operation information by decrementing a time to live, incrementing a hop count, modifying a checksum, truncating a protocol data unit, and/or removing a frame check sequence from the protocol data unit. In addition to enhancing the forwarding process with the modifying operations 306, it may be necessary to pad bytes of data to the protocol data unit in the modification operations 306 such that the header information is aligned on optimal boundaries.

The identifying step 302 may include obtaining particular addresses required in the forwarding process according to one of several algorithms. These algorithms include:

comparing a network destination address of the protocol data unit to a predetermined list of known network destination addresses;

comparing a media destination address of the protocol data unit to a predetermined list of known media destination addresses;

comparing a media source address of the protocol data unit to a predetermined list of known media destination addresses; and comparing a media source address of the protocol data unit to a predetermined list of known media source addresses.

In addition, the identifying step 302 may further include checking for a specifically routed protocol data unit, finding next local area network identifier in a source route of the protocol data unit, and comparing the next local area network identifier to a predetermined list of known local area network identifiers.

The following sections describe in detail the features required for the Fast Packet Processor (FPP) 104 or alternatively known as the protocol data unit preprocessor 104. The FPP 104 is used in products having FDDI, Ethernet, and/or Token Ring interfaces. It will be appreciated by those skilled in the art that the packet formats described in this document use big-endian byte ordering for multiple-byte fields within the packet unless otherwise noted. In addition, it should be noted that the packets described herein refer to protocol data units which can take the form of a packet, cell, or frame of data.

The FPP 104 is implemented as a performance accelerator card (e.g., a field programmable gate array (FPGA))that attaches between the inbound interface 102 media access control (MAC) and shared memory buffer 106. The FPP 104 adds information to or modifies the protocol data unit 140 in either the transmit or receive direction of a data stream.

In the receive direction, the FPP 104 decodes as much of the protocol data unit's header as possible, does some of the protocol-specific work, looks up the protocol-specific destination address in a forwarding CAM 128, and puts any information it gleans into an 8-byte structure called the receive information 142 (info) which is then added to the protocol data unit.

In the preferred embodiment, the receive info 142 is placed at the front of the protocol data unit 140, 4-byte aligned, with 0–3 bytes of padding. In addition, it modifies the 3-byte status word at the end of the protocol data unit 140, which was already generated by the hardware.

The FPP 104 also checks for source route length errors, truncates packets with padding at the end, and removes the frame checksum (FCS) (i.e., a cyclical redundancy check (CRC), when necessary). This is described in the Receive Info section.

Basically, all protocol data units received from the MAC 102 interface look alike. In the transmit direction, the FPP 104 expects 4 bytes of transmit information along with the protocol data unit 140. It uses this information to handle any header translation, address mirroring, and FCS transparency or stripping. This is described in the Transmit Info section.

In the preferred embodiment, the transmit info 142 is placed at the front of the protocol data unit 140, 4-byte aligned, with 0–3 bytes of padding, as with the receive info 142.

The FPP 104 modifies the Receive Status Word (RSW), which was added by the hardware to the end of the protocol data unit 140. Table 1 shows an example of an RSW from a shared bus point of view. The RSW ends up as a separate word write after the end-of-protocol data unit has been asserted. Bit 0 is on the right; bit 31 is on the left. Bits 24 ... 31 are don't cares. It will be appreciated by those skilled in the art that the format and placement of this word may be varied without departing from the scope and spirit of the present invention. In addition, it should be noted that the RSW is but embodiment that out-of-band information can take. The FPP 104 may use some other form of out-of-band information which consists of an error flag or error status without departing from the scope and spirit of the present invention.

TABLE 1

| X | Error | 0 | LRC | Congestion | Error/Status | Destination Queue |
|---|---|---|---|---|---|---|
| 8 bits | 1 bit | 1 bit | 8 bits | 2 bits | 5 bits | 7 bits |
| 31 ... 24 | 23 | 22 | 21 ... 14 | 13 ... 12 | 11 ... 7 | 6 ... 0 |

If an error is detected in the protocol data unit 140 by the FPP 104, it sets the error bit in the RSW and sets the Error Code to reflect the type of error. If the error bit has already been set by the media interface hardware 102, the error code should be left alone.

The following error codes should be implemented:

0×10—Source Route Length Invalid—Source route information was present in the protocol data unit 140, but the length field was odd.

0×11—Protocol Data Unit Length Error—The protocol data unit 140 was too short to perform the required operations for its forwarding type and protocol.

If one of the above errors is detected by the FPP 104, the protocol data unit 140 is placed on the error queue. This is done only if the Error bit was not previously set for this protocol data unit 140 by the interface hardware 102. The following receive status word modifications must be done when placing the protocol data unit 140 on the error queue:

Set the Error bit.

Set the destination queue to 0×28 (the error queue).

Set the Error/Status code to the appropriate value.

When no errors are detected, the status bits take on the following values. If possible, the A and C indicator bits from the FDDI hardware should be preserved:

Bit 11—Exceeded Minimum MTU Size.

Bit 10—FCS Present

The meaning of these status bits will be described in the following sections.

The FPP 104 should check the length of the protocol data unit 140, starting with the first byte after the MAC and logical link control (LLC) headers, and up to, but not including, the FCS. It optionally includes the FCS in this length, and the software will adjust for this when setting the minimum Maximum Trasmit Unit (MTU) size. If this length is greater than the minimum MTU size (i.e., largest permissible frame as configured by the software), the Minimum MTU Size Exceeded flag should be set in the status bits of the block descriptor.

When a protocol data unit 140 is too short to perform the required operations, i.e. an IP route protocol data unit that does not contain an entire IP header, the protocol data unit 140 will be placed on the error queue with a status code of 0×11 (see above section on receive status word modification).

A Forwarding Address Lookup CAM 128 is provided which gives the capability to cache the most-used routing protocol destination addresses, and MAC source and destination addresses for MAC bridging. The hardware 100 would look up the address(es) in the CAM 128, and return an index, which would be used by software to quickly get a pointer into a forwarding table without looking at the protocol data unit 140. This CAM 128 mixes protocols by using the protocol identifier (ID) (or a pseudo protocol ID for MAC source addresses (SAs) and destination addresses (DAs)) as part of the address. The specific addresses that can be looked up are in the individual bridge and route protocol sections.

Some software is necessary to manage this CAM 128, since deleted entries may not be reused until it is certain that there are no protocol data units in the incoming queue referencing them. This is described below in the Media Software section.

Shown below in Table 2 is the general format for a CAM 128 entry.

TABLE 2

| Reserved | Virtual Router | Reserved | Protocol ID | Protocol Address |
|---|---|---|---|---|
| 5 bits (zero) | 3 bits | 5 bits | 3 bits (zero) | 48 bits |

The virtual router is an index into a table of virtual routers using the board. There may be up to one per-port. Several ports (usually all) belong to the same virtual router. Each port must have a 3-bit virtual router index configurable in hardware 100. It should be noted that the bridge CAM entries substitute a domain index for the VR index.

The lower 4 bits of the protocol ID are identical to that produced by the hardware 100 during the decode (see below) when the top bit is zero. When the top bit is one, the CAM 128 entry is either a bridge MAC address entry, which can be used to look up either the SA or the DA of a protocol data unit 140, or a source route SA entry, or a special entry for hardware 100 use.

In a Source Route Header Realignment operation, protocol data units with source route information (i.e., RII bit set) should insert or remove two pad bytes at the front of the protocol data unit 140 when the source route length field is not a multiple of 4. This ensures that the MAC addresses and source route info are 2-byte aligned, and the protocol header is 4-byte aligned. The algorithm for this is simple. In the FPP 104, if the second-to-least-significant bit is 1, add or remove 2 bytes of pad. It will be appreciated by those skilled in the art that for Ethernet, this feature is not required on the FPP 104.

In an IPX SAP Header Realignment operation, the IPX SAP headers present a problem with alignment methods. The three-byte SAP header misaligns the protocol header. If the FPP 104 aligns the protocol header, the MAC header is misaligned. This will currently affect routing IPX packets between FDDI and Token Ring, in which performance is important, and between Ethernet and Token Ring, in which performance is not particularly important. In the future, it may affect FDDI to Ethernet (also important) if network vendors start to use SAP on FDDI.

In order to overcome this problem, the following solution is used.

For Route protocol data units, align the protocol header. This makes bursting a new header on the protocol data unit 140 simple, and makes accesses all to the IPX header aligned. The only caveat is that when the protocol data unit 140 contains source route information that needs to be learned, the source route information is not aligned on a particular boundary. As SA lookup in the CAM 128 is supported for these, it should not be much of a problem.

For Bridge or Source Route Bridge protocol data units (or Other), leave the MAC header aligned on the normal 2-byte boundary. This allows bridging and MAC/LLC header decode code to work in a reasonably convenient alignment. The disadvantage is that when a particular translation is not supported by the outbound FPP 104 (or if there is no outbound FPP), to burst a new header will take more cycles.

The algorithm that implements this is: If Route & IPX & SAP, then remove 3 bytes of pad or add 1 byte.

Non-LLC protocol data units, such as FDDI and Token Ring protocol data units, that are not asynchronous LLC protocol data units, should have the Bridge/Route bits set to Other, Protocol ID set to zero, and the encapsulation type set to Other. However, Media Info should still be generated for these protocol data units.

The following frame formats are provided as a reference for other sections. The following descriptions apply to all formats. All frame header formats in this document show the bytes running in network order from left to right.

AC—Access Control

Present only on Token Ring, this should be 0x10, or 0x90.

FC—Frame control

In FDDI, if FC & 0xf8=0x50, the protocol data unit 140 is an Asynchronous LLC protocol data unit 140. In Token Ring, if FC & 0xf8=0x40, the protocol data unit 140 is an Asynchronous LLC protocol data unit 140. There is no protocol data unit control field on Ethernet. All protocol data units are counted as Async LLC protocol data units.

DA—Destination MAC Address

This is the 48-bit destination address. It should be noted that short addresses will not be supported on FDDI in the FPP 104. The byte ordering preferably is most significant byte (MSB) to least significant byte (LSB) (left to right). In addition, the bit ordering depends on the interface.

For Ethernet, the bit ordering is canonical. The most significant bit within each byte is on the right, and will show up in a central processing unit (CPU) as the least significant bit.

For FDDI & Token Ring, the bit ordering is non-canonical. The most significant bit is on the left, and will show up as the most significant bit in the CPU.

The most significant bit of the entire address is the Multicast bit. This indicates that the protocol data unit 140 is addressed to a group of stations. A special case is the all ones broadcast address, which is addressed to all stations.

SA—Source MAC Address

This is the 48-bit long source address. Bit and byte ordering follow the same rules as the DA. The most significant bit of the address is the RII (Routing Information Indicator) bit. When set, a Route Control field and up to 14 Route Descriptors immediately follow the SA.

Type

This is the protocol type (or ethertype) of the protocol data unit 140. The following values preferably are recognized by the FPP 104:

0x0800 (IP)

0x6003 (DECnet)

0x8137 (IPX)

0x809B (Appletalk)

If this field is<1500, it is really a Length field (described below). This field (either type or length) is big-endian, with the most significant byte appearing first.

Length

This field is only present on Ethernet, and is<1500. It covers the data between, but not including, the Length field itself and the FCS.

DSAP, SSAP, Cntrl

This is the SAP header of the protocol data unit 140. Destination Service Access Point (DSAP) indicates the type of protocol data unit 140 and Source Service Access Point (SSAP) indicates the orgin of the protocol data unit 140. The following values are recognized by the FPP 104:

0×AAAA03 (SNAP encapsulation)

0×E0E003 (IPX SAP encapsulation)

In addition, a (DSAP, SSAP) of 0×FFFF is used to detect an IPX broken 802 protocol data unit 140 (for Ethernet only).

OUI

The Organizationally Unique Identifier (OUI) field is present in SNAP encapsulated packets. The recognized values are:

0×000000 (IP, IPX, DECnet, others)

0×080007 (Appletalk)

The following Ethernet protocol data unit 140 formats are provided for reference by later sections. Protocol headers immediately follow these formats.

The format shown in Table 3 below is commonly used for IP and DECnet traffic.

TABLE 3

| pad | pad | DA ms | DA | DA | DA | DA | DA ls |
|---|---|---|---|---|---|---|---|
| SA ms | SA | SA | SA | SA | SA ls | Type | Type |

This format (i.e., 802.3 SNAP Frames) shown in Table 4 below is commonly used for Appletalk traffic.

TABLE 4

| pad | pad | DA | DA | DA | DA | DA | DA |
|---|---|---|---|---|---|---|---|
| SA | SA | SA | SA | SA | SA | Length | Length |
| DSAP | SSAP | Cntrl | OUI | OUI | OUI | Type | Type |

As shown in Table 5, IPX (i.e., IPX Broken 802.3 Frames) uses a different format from either of the standards.

TABLE 5

| pad | pad | DA | DA | DA | DA | DA | DA |
|---|---|---|---|---|---|---|---|
| SA | SA | SA | SA | SA | SA | Length | Length |
| Cksum | Cksum | etc. | | | | | |

This is similar to the Ethernet format, except that instead of an 802.2 header, IPX just starts right in with the checksum field of its protocol header. Fortunately, this checksum is always 0xffff, so it's easy to identify.

IPX and OSI can use the SAP format shown in Table 6. It will be appreciated by those skilled in the art that the IPX version using the SAP format is not commonly found in Ethernet networks.

TABLE 6

| pad | pad | DA | DA | DA | DA | DA | DA |
|---|---|---|---|---|---|---|---|
| SA | SA | SA | SA | SA | SA | Length | Length |
| DSAP | SSAP | Cntrl | data | data | data | data | data |

Turning now to FDDI frame formats, most FDDI protocol data units use the FDDI SNAP Frames format shown in Table 7.

TABLE 7

| pad | pad | pad | FC | DA | DA | DA | DA |
|---|---|---|---|---|---|---|---|
| DA | DA | SA | SA | SA | SA | SA | SA |
| DSAP | SSAP | Cntrl | OUI | OUI | OUI | Type | Type |

However, OSI uses the SAP format shown in Table 8, and IPX can use it in the future, when network hardware/software vendors start shipping FDDI cards in their servers.

TABLE 8

| pad | pad | pad | FC | DA | DA | DA |
|---|---|---|---|---|---|---|
| DA | DA | SA | SA | SA | SA | SA |
| DSAP | SSAP | Cntrl | data | data | data | data | data |

It should be noted that the FPP 104 can realign IPX SAP protocol data units (see previous discussion) but, OSI and other SAP protocol data units preferably will not be affected.

In addition, Token Ring uses several frame formats in a typical interface. In particular, 802.5 SNAP frames having the format shown in Table 9 are typically used for IP and Appletalk on Token Ring.

TABLE 9

| pad | pad | AC | FC | DA | DA | DA |
|---|---|---|---|---|---|---|
| DA | DA | SA | SA | SA | SA | SA |
| DSAP | SSAP | Cntrl | OUI | OUI | OUI | Type | Type |

Further, IPX and OSI will typically use the SAP frame format shown in Table 10 in Token Ring networks.

TABLE 10

| pad | pad | AC | FC | DA | DA | DA |
|---|---|---|---|---|---|---|
| DA | DA | SA | SA | SA | SA | SA |
| DSAP | SSAP | Cntrl | data | data | data | data | data |

The FPP 104 realigns IPX SAP protocol data units but, OSI and other SAP protocol data units preferably will not be affected.

One 32-bit word (i.e., transmit information) preferably will be added to the front of each protocol data unit 140 to specify to the transmit hardware 108 whether to do header translations, address mirroring, FCS transparency, etc. This word preferably is aligned on a 32-bit boundary, with 0–3 bytes of padding and 2 bits of the transmit information will specify the amount of padding present. For example, an FDDI protocol data unit 140 would usually take the form shown in Table 11.

TABLE 11

| PSI | Txmit | Txmit | Txmit | pad | pad | pad | FC |
|---|---|---|---|---|---|---|---|

Platform specific information (PSI), maybe present, and preferably should be verified by the transmit hardware 108. The byte ordering for the transmit information should match the architecture of the CPU running the forwarding code. All data bytes including the transmit word are in memory in network order. The 32-bit transmit information preferably takes the format (MSB on left) shown in Table 12. Bit numbers are provided for the FPP 104. In software, PSI will show up as the least significant byte and the translate bits are the most significant byte.

TABLE 12

| Translate | Pad | FCSTransparent | FCSStrip | Canonical | Length/FC | LRC |
|---|---|---|---|---|---|---|
| 8 bits | 2 bits | 1 bit | 1 bit | 1 bit | 11 bits | 8 bits |
| 31 ... 24 | 23 ... 22 | 21 | 20 | 19 | 18 ... 8 | 7 ... 0 |

In addition, the FCS Transparency bit is set when the transmit hardware 108 (i.e., forwarding processor) should tell the MAC to source the FCS out of the data stream. If it is not set, the MAC should generate its own FCS. The FCS Strip bit is set, if the FCS is included in the frame but, should be stripped before it gets to the MAC. It should be noted that forwarding device 100 software should take care not to set both the FCS Strip and Transparency bits.

The Canonical bit is set if the MAC DA and SA are in the Canonical bit ordering. After the LRC check, the forwarding hardware 108 must reverse the bits in each byte of these addresses if the bit ordering does not match that of the outgoing interface. Padding Length is set to the number of bytes of padding (0-3) between the transmit information and the actual protocol data unit 140.

The Translation bits specify the type of translation to be done. They are described in detail below. The Length/FC field is used on Ethernet interfaces for translations that convert from other formats into one of the Ethernet 802 formats (SNAP, SAP, or IPX Broken). As the maximum value of this field is 1500, only the lower 11 bits appear in this field; the forwarding hardware 108 should set the upper 5 bits to zero. On FDDI and Token Ring interfaces, the lower 8 bits of this field are the frame control to add to the protocol data unit 140.

The translation bits preferably are formatted as follows in Table 13.

TABLE 13

| Conversion Type | Incoming Interface | Protocol Index |
|---|---|---|
| 3 bits | 2 bits | 3 bits |
| 31 ... 29 | 28 ... 27 | 26 ... 24 |

The Conversion Type specifies the source and destination protocol data unit 140 formats. Three formats are supported: SNAP, SAP, and Ethertype. IPX Broken 802 protocol data units are treated as a special case of Ethertype. The Conversion Type can take the following values:

0—No Conversion—does no conversion at all, and ignores the Incoming Interface bits.

1—Interface Type Conversion Only—does no header type conversion, but does do interface type conversion (i.e. FDDI to Ethernet).

2—SNAP to SAP

3—SNAP to Ether

4—SAP to SNAP

5—SAP to Ether

6—Ether to SNAP

7—Ether to SAP

The Incoming Interface bits specify the incoming interface type, used to decide whether to strip, add, or modify the AC, FC or 802.3 Length field. They can take the following values:

0—Unknown or Default—No interface type translation is done if this value is set. However, canonical/non canonical bit mirroring is done if the Conversion Type is set to Interface Type Conversion Only.

1—Ethernet—the protocol data unit's incoming format is Ethernet

2—FDDI

3—Token Ring

It should be noted that when converting to either FDDI and Token Ring, the protocol data unit 140 control must be taken from the Length/FC field. In addition, when converting to Token Ring, the Access Control should be set to 0×90.

The Protocol Index is used to determine which Protocol Type, OUI, or SAP field to use during some types of conversions. It should be noted that this Protocol Index is not the same as the Protocol Type used by the receive information 142 and it could be implemented as shown in Table 14.

TABLE 14

| Protocol Index | SAP Header | OUI | Protocol Type |
|---|---|---|---|
| SNAP | unused | 000000 | unused |
| Tunnel (802.1h) | unused | 0000f8 | unused |
| IPX | e0e003 | 000000 | 8137 |
| Apple | unused | 080007 | 809b |

In using Table 14, several items should be remembered, including:

IP, DECnet, Xerox Network Service (XNS), and probably others can use the SNAP Protocol Index, since they use OUI=0 and do not use the SAP format.

OSI uses only the SAP format, so only interface type conversion is done.

In addition, several rules for selecting SAP header, OUI, and Type should be followed, including:

When converting between Ethertype and SNAP, the Type field must be preserved, instead of looked up in the table. The only exception is, of course, IPX. When converting an IPX packet from Ether to SNAP, the Type field must be looked up in Table 14 (0×8137). This allows the source interface to use the Ether format for IPX Broken 802 packets.

When converting between SNAP and SAP, the SAP Header must be referenced from Table 14. It must not be preserved.

When converting an IPX protocol data unit 140 from SNAP or SAP to Ether, if the Length specified in the transmit info is zero, the Protocol Type from the table should be selected, as in any other protocol. If the Length field is non-zero, it should be put in the protocol data unit 140 in place of the Protocol Type, to support translation to the IPX Broken 802 format.

When converting to SNAP, the SAP header 0×aaaa03 should be used. It should not be sourced from Table 14.

Further, some other translation rules apply, including:

When Interface Type Conversion Only is specified, the forwarding hardware 108 must still add/remove/modify AC & FC, and must still add or remove the 802.3 length field when converting between Ethernet and FDDI or Token Ring.

When Interface Type Conversion Only is specified, any SAP, OUI, or Type fields must be left unchanged.

The RII bit and any source route information must be left alone in all cases.

For protocol data units received by the forwarding system 100, two 32-bit words, added to each received protocol data unit 140, are needed to communicate any protocol decoding or address lookups done by the forwarding hardware 108. The first word contains media header and protocol decoding information and the second contains address lookup information, where applicable. The two words are collectively called the receive information 142.

The receive information 142 preferably is aligned on a 32-bit boundary, with 0–3 bytes of padding between it and the start of the protocol data unit 140. Two bits of the receive information 142 will specify the amount of padding present. For example, an FDDI protocol data unit 140 would look like the one shown in Table 15.

TABLE 15

| RcvInfo | RcvInfo | RcvInfo | RcvInfo | RcvInfo | RcvInfo | RcvInfo | RcvInfo |
|---------|---------|---------|---------|---------|---------|---------|---------|
| pad | pad | pad | FC | DA | DA | DA | DA |

The receive information 142 must be included by the FPP 104 in the start and length of the first block of the protocol data unit 140 for the preferred embodiment implementation. As a result, the receiving software must remove the receive information 142. In addition, the byte ordering for the receive information 142 should match the architecture of the CPU running the forwarding code. All data bytes after the receive word 142 shall be placed in memory 106 in network order. The first word of the receive information 142 is defined as shown in Table 16 (MSB on the left).

Rsvd is a reserved bit, and is set to zero by the FPP 104.

Async is set if the protocol data unit 140 is an Asynchronous LLC protocol data unit.

Match is set if the MAC DA matched the Unicast or Alternate (DECnet) Unicast address of the incoming port.

Mcst is a copy of the Multicast bit from the MAC DA.

SR Length is a copy of the upper 4 bits of the 5-bit length field in the source route control field, if source route information is present. If source route information is not present, it is returned as zero.

RII (Routing Information Indicator) is a copy of the Multicast bit from the MAC SA.

VFF is the Very Fast Forwarder bit. This bit is set differently depending on the protocol ID and the Bridge/Route bits. It is described separately in each of the following appropriate sections.

B/R is the Bridge/Route bit. It can take on four values, including:

1—Route—If the Protocol ID is known, the FPP 104 has included routing information in the Protocol Info field.

2—Bridge—The FPP 104 has included transparent bridging information in the Protocol Info field.

3—Source Route Bridge—The FPP 104 has included source route bridging information in the Protocol Info field.

TABLE 16

| Path | Flags | Encap | Pad | Rsvd | Async | Match | Mcst | SR Len | RII | VFF | B/R | Protocol |
|------|-------|-------|-----|------|-------|-------|------|--------|-----|-----|-----|----------|
| 6 bits | 6 bits | 2 bits | 2 bits | 1 bit | 1 bit | 1 bit | 1 bit | 4 bits | 1 bit | 1 bit | 2 bits | 4 bits |
| 31–26 | 25–20 | 19–18 | 17–16 | 15 | 14 | 13 | 12 | 11–8 | 7 | 6 | 5...4 | 3...0 |

Path is a hash computed by the FPP 104 on the appropriate source and destination addresses, depending on the Protocol type and Bridge/Route bits. The upper 2 bits of this field are used to implement equal-cost multipath features in the routing protocols; the lower 4 bits are for use by outbound WAN media for load-sharing.

Flags is the Protocol Info Flags field. Its contents depend on the values of the Protocol ID and the Bridge/Route bits. This field is described in detail for each protocol and for transparent and source route bridging later.

Encap is the Encapsulation Type used in the LLC header. The four possible types are:

0—Other—(None of the above)—This includes non-LLC protocol data units on TR and FDDI. Also, it includes IPX Broken 802 protocol data units.

1—SNAP—The header includes the DSAP/SSAP/Cntrl/OUI/Type sequence.

2—Ethernet—The header just includes the ethertype field after the MAC header (Ethernet only).

3—SAP—The header includes the DSAP/SSAP/Cntrl bytes and starts right in with the protocol header (used by IPX and OSI).

Pad is the Pad Length, which specifies the number of bytes of padding between the receive information 142 and the start of the protocol data unit 140.

0—Other—This includes Multicast and non-LLC protocol data units. The FPP 104 should include "Other" information in the Protocol Information field. However, the Protocol ID field is still valid.

Proto ID—The Protocol Identifier is a 4-bit integer specifying the protocol data units protocol, such as IP, IPX, DECnet, or Appletalk. A value of all zeros is reserved for the case when the protocol is not known to the FPP 104. It should be noted that this field is not affected by the Bridge/Route bits, and should always be either valid or zero.

The second word of the receive information 142 is defined as shown in Table 17.

TABLE 17

| Source Address Lookup | Destination Address Lookup |
|-----------------------|----------------------------|
| 16 bits (31 ... 16) | 16 bits (15 ... 0) |

The Source Address Lookup field is the index of the MAC source address in the forwarding CAM 128, when the protocol data unit 140 is expected to be bridged. It is also used to look up the source address (less the RII bit) of routed (end-station) protocol data units with source route information. If no CAM match was found, this field should be set to all ones.

The Destination Address Lookup field is either the index of the MAC destination address in the forwarding CAM 128, if the protocol data unit 140 is expected to be bridged, or the index of the routing protocol destination address (i.e. the IP destination), if the protocol data unit 140 is expected to be routed, or the index of the next LAN ID lookup if the protocol data unit 140 is expected to be source-routed. If no address is found, this field should be set to all ones.

The valid bits of the SA and DA Lookup fields are set if the corresponding address was found in the CAM 128. If the address was not found in the CAM 128, the field must be set to all ones.

The Bridge/Route bits can take on one of several values including: route, transparent bridge, source route bridge, or other.

The route value indicates that the protocol data unit 140 will either be routed or used internally, and will not be bridged. It is selected by the FPP 104 when:

The protocol data unit 140 is an asynchronous LLC protocol data unit 140.

The MAC DA matches either the Unicast or Alternate Unicast address for this port.

This implies that the protocol data unit 140 is not a multicast protocol data unit 140, as long as the software does not set either of the above-mentioned addresses to a multicast address, which should not be done anyway. Also, these protocol data units may contain source route information if the RII (SA Multicast) bit is set.

The transparent bridge value indicates that the protocol data unit 140 will either be transparent bridged or thrown away, depending on the software configuration. It is selected when:

The protocol data unit 140 is an asynchronous LLC protocol data unit 140.

The MAC DA matches neither the Unicast or Alternate Unicast address for this port.

The Multicast bit is not set in the DA.

The Multicast bit is not set in the SA, OR Source Routing is not enabled on the port. This allows transparent bridging of SR protocol data units when configured to do so.

Protocol data units with source route information must have their Error flag set in the receive status word if the source route information is odd.

The source route bridge value indicates that the protocol data unit 140 will either be source route bridged or thrown away, depending on the software configuration. It is selected when:

The protocol data unit 140 is an asynchronous LLC protocol data unit 140.

The MAC DA matches neither the Unicast or Alternate Unicast address for this port.

The Multicast bit is not set in the DA.

The Multicast bit is set in the SA.

Source Routing is enabled on the port.

The other value is selected when none of the above-mentioned conditions apply. This includes Multicast and non-LLC protocol data units.

The MAC/LLC header length can be computed by the FPP 104 software using a combination of the following fields:

Pad Length

Encapsulation Type

Source Route Length

RII (The SA Multicast bit in the media information, described below)

MAC_Length—An array of four header lengths, one for each encap type. This may be different on different media types.

The following formulae will compute the length of the receive information 142, padding, MAC header, and LLC header. These can be used by a very fast forwarder to strip all of these from a protocol data unit 140 at once.

Receive Information 142 and Padding:

$$8+Pad\_Length \qquad (EQ1)$$

MAC & LLC header (may contain source route information):

$$MAC\_Length[Encap]+(SR\_Length<<1) \qquad (EQ2)$$

MAC & LLC header (no source route info):

$$MAC\_Length[Encap] \qquad (EQ3)$$

The ethernet MAC_Length array elements are:

MAC_Length[ENCAP_802.2]=22

MAC_Length[ENCAP_ENET]=14

MAC_Length[ENCAP_SAP]=17

MAC_Length[ENCAP_OTHER]=14//Used for IPX Broken.

The maximum header lengths for an Ethernet protocol data unit 140 (assuming end station source routing is not supported by the FPP 104):

IP—42 bytes (SNAP-encapsulated, no options support)

IP—82 bytes (SNAP, with options support in FPP)

IPX—52 bytes (SNAP)

Apple—35 bytes (SNAP)

DECnet—51 bytes (SNAP with 6 bytes of pad)

The FDDI MAC_Length array elements are:

MAC_Length[ENCAP_802.2]=21

MAC_Length[ENCAP_ENET]=Not Used

MAC_Length[ENCAP_SAP]=16

MAC_Length[ENCAP_OTHER]=13

The maximum header lengths for an FDDI protocol data unit 140 (assuming a maximum length source route of 30 bytes):

IP—71 bytes (SNAP-encapsulated, no options support)

IP—111 bytes (SNAP, with options support in FPP)

IPX—81 bytes (SNAP)

Apple—64 bytes (SNAP)

DECnet—80 bytes (SNAP with 6 bytes of pad)

The Token Ring MAC_Length array elements are:

MAC_Length[ENCAP_802.2]=22

MAC_Length[ENCAP_ENET]=Not Used

MAC_Length[ENCAP_SAP]=17

MAC_Length[ENCAP_OTHER]=Not Used

The maximum header lengths for a Token Ring protocol data unit 140 (assuming a maximum length source route of 30 bytes):

IP—72 bytes (SNAP-encapsulated, no options support)

IP—112 bytes (SNAP, with options support in FPP 104)

IPX—82 bytes (SNAP)

Apple—65 bytes (SNAP)

DECnet—81 bytes (SNAP with 6 bytes of pad)

The media information field is valid for all protocol data units, and is the same whether bridging, routing, or source-routing is expected. The media information field is currently common to all LAN interface types. It will be appreciated that a MAC SA Unicast Match bit has been omitted. The reason for not doing this is that:

The hardware is required never to copy its own protocol data units.

Duplicate addresses should not exist on a LAN in the first place, or are dealt with by the MAC (as with FDDI).

The DA Unicast Match bit is set when the destination address of the protocol data unit 140 is the same as the MAC address of the receiving interface. It is also set if the destination address of the protocol data unit 140 matches the DECnet address on alternate MAC.

The DA Multicast Set bit is set when the multicast bit of the destination address of the protocol data unit 140 is set.

The RII Bit Set bit is set when the multicast bit of the source address (the Routing Information Indicator) is set.

The Asynchronous LLC protocol data unit 140 bit indicates that the protocol data unit 140 is an asynchronous LLC protocol data unit 140. For ethernet, this is always set. For FDDI, it is set if (FC & 0xf8)=0x50 (FC is the 8-bit frame control). For Token Ring, it is set if (FC & 0xf8)=0x40. If the protocol data unit 140 is not an async LLC, the encapsulation type should be Other, and the Protocol type should be Unknown. The Bridge/Route bits should be set to Other.

The following protocols are sorted by the forwarding hardware 108, and optionally define protocol information bits to be set by the forwarding hardware 108. The following protocols preferably will be supported by the FPP 104:

0—Unknown. This can be any protocol. The forwarding device 108 software gets to figure this one out.

1—IP (non-Address Resolution Protocol (ARP))

3—Appletalk

4—IPX Base Protocol ID (also IPX Broken Encap)

5 . . . 7—IPX SNAP, Ether, and SAP Encaps

IPX uses up four identifiers. The IPX type used throughout the FPP 104 should be 4, which is the IPX Base Protocol ID. When the protocol ID field in the receive information is written, the encap type is placed in the lower two bits if the protocol type was 4 (IPX), which means we have to reserve 5 . . . 7 for IPX as well. This does not affect any other protocols.

The routing receive information descriptions apply when the Bridge/Route bits are set to Route, and the protocol ID is known. The source route information may be present on any of these protocol data units. If it is present, the forwarding hardware 108 should look up the MAC source address in the forwarding CAM 128, and put its index into the SA lookup index field, if found. This will be used by forwarding device 108 software to determine whether the source route needs to be learned. Protocol data units with odd-length source route information will not be received by the forwarding hardware 108. The following sections describe protocol detection, header manipulation, and protocol-specific receive information bits 142.

The following conditions must be true for a protocol data unit 140 to be an IP forwardable protocol data unit 140:

The Bridge/Route bits are set to Route.

The protocol data unit 140 is an LLC Asynchronous protocol data unit 140.

For Ethernet protocol data units:

The ethertype is 0x0800—OR (SNAP)—

OUI=0x000000

Protocol ID (ethertype)=0x0800

For FDDI and token ring protocol data units (SNAP format only):

OUI=0x000000

Protocol ID=0x0800

Below in Table 18, the IP protocol header structure (from RFC 791) is shown.

TABLE 18

| V/IHL | TOS | Length | Length | ID | ID | FO | FO |
|---|---|---|---|---|---|---|---|
| TTL | Proto | Cksum | Cksum | SA | SA | SA | SA |
| DA | DA | DA | DA | Option | pad | pad | pad |

The V/IHL field consists of the IP Version (upper 4 bits), and the IP Header Length (lower 4 bits). The header length is in 32-bit words. The checksum covers the entire header (IP Header Length * 4). If the IP Header Length is 5, no options are present, and the data starts in the Option field above.

An IP header with no options is 20 bytes long; the maximum size with options is 60 bytes. The Length, Cksum, ID, and FO fields are in Big-Endian format. The Length field is the total length in bytes of the protocol data unit 140, including this header, in bytes. It does not include the FCS generated by the MAC.

Shown in Table 19 below is the FO (Fragment Offset) field.

TABLE 19

| Reserved | Don't Fragment | More Fragments | Fragment Offset |
|---|---|---|---|
| 1 bit = 0 | 1 bit | 1 bit | 13 bits |

When enabled, the IP FPP 104 should decrement the TTL (Time-to-live) field, and modify the checksum to reflect this.

The IP Checksum OK bit indicates that the IP header checksum of the protocol data unit 140 was OK. The checksum covers the first five long words of the header when there are no options present. It may or may not be checked when options are present, depending on whether this can be done in the FPP 104.

The IP Time-To-Live Unforwardable bit indicates that the time-to-live value of the protocol data unit 140 was less than 2 before it was decremented by the FPP 104. If this bit is set, the protocol data unit 140 may still be valid for local receive, if the TTL was 1. Since this bit being set may be OK for locally addressed protocol data units, it should be separate from the others.

The IP Check Header (Bit 24) bit indicates that the IP Checksum was invalid (see below), the IP header version is not version 4, or that the IP header length was less than 5. If this bit is set, no further processing, especially modification of time-to-live, and packet truncation, should be done on the protocol data unit 140. The IP checksum covers the first five long words of the header when there are no options present. When options are present, the IP checksum is not checked.

The IP Options Present bit is set by the FPP 104 if the IP header length is >5, meaning that IP options are present. When this bit is set, the FPP 104 has not checked the checksum. However, the time-to-live and checksum should still be modified.

The Type of Service 3-bit field is a copy of the lower three bits of the Type-of-Service (TOS) byte in the IP header.

The Path Number 6-bit field is used for implementing the equal-cost multipath feature, as well as for use by outbound WAN media for loadsharing purposes. It consists of the lower six bits of the exclusive-or of the least significant two bytes of the IP source and destination addresses.

The VFF bit is set for IP when:

The IP Options bit was not set.

The Check Header bit was not set.

The Time-To-Live Unforwardable bit was not set.

The IP Forwarding Lookup (described below) was successful.

The 32-bit DA field of the LP header should be looked up in the forwarding CAM 128, and the corresponding address should be put in the Destination Address Lookup field of the receive information 142. If Type-of-Service routing is enabled for the port (see below), the 3-bit Type of Service should be used as part of the CAM 128 lookup address. Otherwise, the Type of Service (TOS) bits in the lookup address should be zero (but the TOS returned in the above bits should still be valid).

Table 20 shows an example CAM 128 entry format for IP.

TABLE 20

| Reserved | Virtual Router | Reserved | IP Protocol ID | Zero | TOS | IP Address |
|---|---|---|---|---|---|---|
| 5 bits (zero) | 3 bits | 3 bits (zero) | 5 bits | 13 bits | 3 bits | 32 bits |

It will be appreciated that CAM 128 Entries should be added by the Fast Forwarder 108 when:

The entry is not the destination address of any local port in the box. This allows the forwarding device 108 software to assume that CAM 128 matches are not locally addressed.

Several IP hardware configurations are also be set to configure the operation of the FPP 104. For example, the IP TOS Routing Enabled bit should be configured on a per port basis. When set, the TOS filed is used as part of the CAM 128 lookup address. Otherwise, zero should be used.

Turning now to routing receive information 142 of IPX protocol data units. Some IPX protocol data units can be detected as in IP, with a protocol ID of 0×8137. The other IPX protocol data units can be detected as follows:

IPX Broken 802.3—DSAP and SSAP are 0×ffff. Note that these bytes are the first 2 bytes of the IPX header (checksum). This format is used only on Ethernet. The FPP should set the encapsulation type to Ethernet, and set the IPX Broken bit shown below.

—OR—

IPX SAP—The first three bytes of the LLC header are 0×e0e003. The IPX header immediately follows these three bytes. This encapsulation is commonly used on Token Ring, and can theoretically occur on Ethernet. It is also likely to appear on FDDI in the near future.

The MAC headers may have been aligned differently by the forwarding system 100 on these protocol data units. In any case, if IPX is routed, the IPX protocol header will start on a 4-byte boundary.

Table 21 shows the preferred IPX protocol data unit 140 header structure.

TABLE 21

| Cksum | Cksum | Length | Length | TC | Type | DNet | DNet |
|---|---|---|---|---|---|---|---|
| DNet | DNet | DNode | DNode | DNode | DNode | DNode | DNode |
| DSock | DSock | SNet | SNet | SNet | SNet | SNode | SNode |
| SNode | SNode | SNode | SNode | SSock | SSock | data | data |

The length field includes this header (30 bytes) plus the data following it. It does not include the MAC-level FCS. The Checksum field covers the same data as the Length field, except that for the purposes of computing the IPX checksum, the Transport Control (TC) field and the Checksum field itself are both considered to be zero, regardless of their actual value. Therefore, the header checksum does not need to be modified when modifying the TC field. The Length and Checksum fields use Motorola-suggested (Big-Endian) byte order.

If configured to do so, the FPP 104 should perform the following IPX header modifications:

Write 0×ffff over the checksum to get rid of it.

Increment TC (transport control) and set a flag if reaches the minimum max hop count.

Potentially support whatever checksum rules other network software vendors come up with.

The two IPX information bytes to be added to each IPX protocol data unit 140 has several parts. One bit is an IPX Broken 802 bit which is set if the encapsulation is IPX Broken 802. The encapsulation type will be set to Ethernet. Another bit is an IPX Short Frame bit which is set when the length field is<32.

IPX Check Transport Control (Bit 22) indicates that the transport control field was incremented to the smallest maximum transport control, and should be rechecked by software.

IPX Source Network Zero (Bit 23) indicates that the source network number field was zero. The software may need to fill in the source network number. This case should not be common for forwarded protocol data units IPX Destination Node Multicast (Bit 24) bit is a copy of the lower bit of the first byte (in network order) of the Destination Node field. This bit being set indicates that the protocol data unit 140 may be a network-layer broadcast protocol data unit 140.

IPX NetBios Packet Type (Bit 25) bit is set if the Type field is 0×14, indicating a NetBIOS protocol data unit that requires special handling.

An IPX Path Number is used for implementing the equal cost multipath feature. It is a lower 6-bits of an exclusive-or (XOR) of the least significant two bytes of IPX source and destination nodes. Finally, an IPX VFF bit should be set when:

The protocol data unit 140 is not a short protocol data unit.

The Check Transport Control bit has not been set.

The Source Network Zero bit is not set.

The Destination Node Multicast bit is not zero.

The NetBios protocol data unit bit is not set.

A CAM 128 entry was found for the Destination Net.

The IPX specific FPP 104 should also look up the Destination Net in the forwarding CAM 128 and place its index into the Destination Lookup field of the receive information bytes 142.

The IPX forwarding hardware 104 should look up the Destination Net in the forwarding CAM 128 and place its index into the Destination Lookup field of the receive information 142. The protocol ID used is the IPX base protocol ID, regardless of the incoming protocol data unit's encapsulation. Shown in Table 22 is the CAM 128 entry format for IPX.

TABLE 22

| Reserved | Virtual Router | Reserved | IPX Proto ID | Zero | Destination Net |
|---|---|---|---|---|---|
| 5 bits (zero) | 3 bits | 3 bits (zero) | 5 bits | 16 bits | 32 bits |

CAM 128 entries should be added by the FPP 104 when:
- The entry is already in the Local Cache.
- The entry is not yet in the CAM 128.
- The Destination Net is non-zero.

The following values need to be configured for the IPX specific FPP 104 configuration. One such value is the Maximum Transport Control bits which are used later to determine if the Check Transport Control bit should be set. The FPP 104 should set this to be the smallest maximum transport control of any of the ports on the card, shifted right two bits.

Turning now to routing receive information 142 of Appletalk protocol data units, Appletalk II protocol data units use the SNAP format only. The SNAP OUI is 0×080007 and the protocol type (ethertype) is 0×809B. Shown in Table 23 is an Appletalk Datagrown Delivery Protocol (DDP) header structure.

TABLE 23

| Length | Length | Cksum | Cksum | DNet | DNet | SNet | SNet |
|---|---|---|---|---|---|---|---|
| DNode | SNode | DSock | SSock | Type | data | data | data |

All multiple-byte fields are in Big-Endian byte order. The Length and Checksum fields are not included in the checksum. The Length field is defined as follows in Table 24.

TABLE 24

| Zero | Hop Count | Length |
|---|---|---|
| 2 bits (15 . . . 14) | 4 bits (13 . . . 10) | 10 bits (9 . . . 0) |

The first byte of the length field contains the hop count as its middle four bits. The Length field includes this entire protocol data unit 140 header, plus the data.

If configured to do so, the FPP 104 should perform Appletalk long header modifications including increment the hop count and check it. Non-zero checksum do not require checking by a router, but should be checked in software when addressed to the forwarding system 100.

The two Appletalk information bytes to be added to each Appletalk protocol data unit 140 has several parts. One bit (bit 21 of the receive information) is a DDP Type=0 bit which is set when the DDP type field is zero. A Hop Count Expired (bit 22) is set when the hop count was ≧15 before the FPP 104 incremented it. A Bad Length bit (bit 23) is set when the length field is<13 or>599 (586+13).

An Appletalk Path Number Computation field consists of the lower 6 bits of the exclusive-or of the source and destination nodes, and the least significant byte of the source and destination networks.

An Appletalk VFF bit is set when:
- The DDP Type is not zero.
- The Hop count has not expired.
- The Bad Length bit is not set.
- An entry was found in the CAM 128 for the Destination Net & Node.

The Appletalk specific FPP 108 should look up the 16-bit Destination Net and 8-bit Destination Node in the forwarding CAM 128 for long header protocol data unit 140. Table 25 shows a CAM 128 entry format for Appletalk.

TABLE 25

| Reserved | Virtual Router | Reserved | Apple Proto ID | Zero | Dest Node | Dest Net |
|---|---|---|---|---|---|---|
| 5 bits (zero) | 3 bits | 3 bits (zero) | 5 bits | 24 bits | 8 bits | 16 bits |

CAM 128 entries should be added by the FPP 104 when:
- The entry is a REMOTE entry.
- The Destination Net is non-zero.
- The Destination Node is not 0×ff.
- (Dnet, Dnode) is not a local address for a port in the specified virtual router.

The destination net compare with the pores net should be done as is done in IPX.

No values need to be configured for the Appletalk specific FPP 104 configuration.

Turning now to routing receive information 142 of DECnet Phase IV and Phase IV Prime protocol data units. DECnet protocol data units are detected as in IP, except that the protocol ID (ethertype) is 0×6003. If an additional MAC address is allowed for DECnet on the forwarding hardware 108, this additional address should be used in the Unicast match for DECnet protocol data units.

Only DECnet long data protocol data units need to be recognized by the FPP 104. For these protocol data units, padding occur between the Length and Flags fields; however, the general formate is shown in Table 26.

TABLE 26

| Length | Length | Flags | D Area | D Sub | D-ID | D-ID | D-ID |
|---|---|---|---|---|---|---|---|
| D-ID | D-ID | D-ID | S Area | S Sub | S-ID | S-ID | S-ID |
| S-ID | S-ID | S-ID | NL2 | Visit | Sclass | Ptype | data |

The flags field preferably takes the form shown in Table 27 below.

TABLE 27

| Pad Field | Future Version | Intra-LAN | RTS/RQR | Format |
|---|---|---|---|---|
| 1 bit | 1 bit | 1 bit | 2 bits | 3 bits |

If the pad field=1, the lower 7 bits of flags specifies the pad length, which includes this byte. In this case, the pad bytes should be skipped, then a new flags field will occur. Typically, padding is either 0 or 1 byte and only 6 bytes maximum are allowed. Any padding over six bytes is considered an error.

The whole DECnet header takes 23 to 29 bytes, depending on the pad length. The last two bytes of the destination ID consist of the Destination Area and Destination Node.

These are used by the forwarding CAM 128 lookup mechanism. The length field is in Little-Endian byte order, and includes the DECnet header and data, but not the length field itself. It also includes any pad bytes, if present.

If configured to do so, the FPP 104 should do the following DECnet header modification.

Increment and check visit count.

Clear the intra-LAN bit if it was set.

Truncate the protocol data unit 140 to the size specified by the Length field.

If a protocol data unit is not a long data protocol data unit 140, no modifications should be done to it. The forwarding system 100 can handle the intra-LAN bit in two ways, depending on whether it configures the FPP 104 to clear it. The recommended method is to allow the FPP 104 to clear the intra-LAN bit. The forwarding device 108 then sets the intra-LAN bit on the way out only if the incoming 102 and outgoing 110 interfaces are the same, and the intra-LAN bit was set before the FPP 104 cleared it. This should not happen often, so the forwarding device 108 will rarely have to modify the bit. The alternate method is to have the forwarding system 100 leave the bit alone. This will cause the forwarding device 108 software to handle the bit normally, which will often result in the software clearing the bit (which is an expensive read-modify-write). This is not recommended, but will have to be done when no FPP 104 is present.

The two DECnet information bytes to be added to each DECnet protocol data unit 140 has several parts. One bit is the DECnet Address Match bit which is set if the MAC address of the protocol data unit 140 matched the DECnet address. Another bit is the Long Data Packet bit which indicates that the protocol data unit 140 is a long data protocol data unit 140. Short data protocol data units and any other protocol data units will be handled by the slow handler, so if this bit is not set, the FPP 104 need not worry about the others. This bit should be set if the flags field (bit-wise) is set to 00XXX110, where the x is a don't care.

An Intra-LAN Bit Set bit indicates that the intra-LAN (i.e., it is also called the intra-ethernet) bit was set. The FPP 104 should always clear the intra-LAN bit when DECnet header modification is enabled. The forwarding device 108 software can set it as needed.

A Check Header bit is set if something was not normal in the header.
This can happen when:

The protocol data unit 140 is too short (packet_length<32).

The visit count exceeded the limit.

The padding is more than 6 bytes long.

This bit being set does not imply that there is anything wrong with the protocol data unit 140; if it is set, it should be put through the normal header checks before dropping or forwarding. This is especially the case with protocol data units<32 bytes.

Also, 3 padding bits are set to the number of bytes (up to 6) of padding present in the protocol data unit 140. Padding is normally either 0 or 1 byte. If pad length is greater than 6, then an error condition has occurred.

A DECnet Path Number Computation field consists of the lower 6 bits of the exclusive-or of the least significant two bytes of the DECnet source and destination IDs, which contain the area and node numbers of these addresses.

The DECnet Very Fast Forwarder (VFF) bit is set when:

The Long Data Packet bit is set.

The Check Header bit is not set.

The Area & Node were found in the CAM 128.

The DECnet specific FPP 104 should use the Area & Node (last two bytes of the Destination ID) in the forwarding CAM 128 for long data protocol data units. Table 28 details the CAM entry format for DECnet.

TABLE 28

| Reserved | Virtual Router | Reserved | DEC Proto ID | Zero | Area & Node |
|---|---|---|---|---|---|
| 5 bits (zero) | 3 bits | 3 bits (zero) | 5 bits | 32 bits | 16 bits |

CAM 128 Entries are added by the FPP 108 when:

The Area and Node does not match that of any local port.

The Area and Node are non-zero, and do not exceed the maximums.

The following values need to be configured for the DECnet specific FPP 104 configuration. A Maximum Visit Count 8-bit value is the maximum value the visit count can reach before exceeding the limit. This will be configured on a per-board basis. If multiple virtual routers are using the board, then the FPP 104 will just configure the minimum of these numbers, causing frames with large visit counts to be handled by the forwarding device 108.

In addition to supporting routing functions, the FPP 104 preferably is configured to append MAC bridge receive information bytes 142 to a protocol data unit 140. If neither of the Unicast Match bits are set, and either the SA Multicast bit is not set or source routing is not enabled for the port (see the Source Routing Configuration description above), the protocol data unit 140 is a candidate for MAC bridging, and the MAC Bridge Protocol Info field will be defined. It should be noted that the Protocol Identifier is still valid and necessary, so routed protocol identifier protocol data unit 140 can be thrown out. In addition, protocol data units with odd-length source routes will not be copied by the forwarding system 100.

The following Protocol Information bits are specified for a MAC bridge protocol data unit 140:

User Priority

This is actually three bits, removed from the protocol data unit 140 control on an FDDI or token ring protocol data unit 140, and zero on an ethernet protocol data unit 140. If the number of bits which can be allocated to Protocol Information bits is limited, this could just be one bit which is set if the priority field is non-zero and which will be the exception case. The FPP 104 could then read it from the protocol data unit 140 control.

SA=DA

This bit is set when the source and destination MAC addresses are the same. This bit is not necessary if the forwarding system 100 can automatically discard these protocol data units.

A MAC Bridge VFF Bit is set when:

SA=DA.

The DA was found in the CAM 128.

Source Route information, if present, does not have a zero length.

The Protocol ID is not zero.

For MAC Bridge protocol data units, the FPP 104 should look up both the MAC SA and DA in the forwarding CAM 128, and put their indices in the Source and Destination Address Lookup fields of the receive information 142. Table 29 shows the preferred CAM 128 entry format for MAC Bridge Addresses.

TABLE 29

| Reserved | Domain Index | Reserved | SA or DA ID | MAC Address |
|---|---|---|---|---|
| 5 bits (zero) | 3 bits | 3 bits (zero) | 5 bits = 0 × 10 | 48 bits |

The protocol ID field for Bridge Addresses is specified in the assigned numbers section. The CAM 128 entries should be added by the FPP 104 when:

The entry is not a multicast address.

The entry is not a static entry.

The entry is not a unicast or alternate unicast address of any local port.

Some values need to be configured for the MAC Bridge specific FPP 104 configuration. One such value is a Domain Index which is configured per-port and is used as part of the CAM 128 lookup. It takes 3 bits.

Another function is translation bridging which is an attempt to describe some of the header translations necessary in either software or hardware for translation bridging. Since there could be many different translations between LAN interfaces, only a few important cases will be selected to be performed by the FPP 104 in combination with the forwarding device 108. These translations are performed on the outbound side 110 of the forwarding system 100, without processor intervention.

Since performance is usually the most critical between a backbone and the interfaces it serves, translation between Ethernet and FDDI, and between Token Ring and FDDI preferably will be performed by application specific hardware in the forwarding system 100 which optionally could be coupled within the FPP 104. Translation between different Ethernet formats, translation between Ethernet and Token Ring, and translation between IPX broken formats preferably will be accomplished in software routines in the FPP 104.

The precise protocol data unit 140 header manipulations were described above. The following cases preferably are supported in application specific hardware:

FDDI to Ethernet

FDDI to 802.3 Ethernet (if Length field can be communicated)

FDDI to Token Ring (802.5)

Ethernet to FDDI 802.3 Ethernet to FDDI

Token Ring (802.5) to FDDI

This application specific translation hardware also should support source routed protocol data units.

In addition to supporting routing functions and MAC bridging, the FPP 104 preferably is configured to append source route bridging receive information bytes 142 to a protocol data unit 140. Source Route Bridging (SRB) does not need to be supported on the Ethernet specific FPP 104. On Ethernet, the detection of SRB protocol data units should be sufficient. A protocol data unit 140 is treated as a source route protocol data unit 140, if source routing is enabled and the SA multicast bit is set and neither Unicast Match bit is set.

If the multicast bit of the SA is set, this is a source route protocol data unit 140. Source routing information is up to 30 bytes long (in 2 byte increments) and immediately follows the source address of any media header. This information consists of 2 bytes of routing control information, followed by up to eight 2-byte route designator fields. The routing control bits are defined as follows in Table 30 (i.e., most significant bit first).

TABLE 30

| Broadcast | Length | Direction | Largest | Reserved |
|---|---|---|---|---|
| 3 bits | 5 bits | 1 bit | 4 bits | 3 bits |

Broadcast—If the most significant bit is zero, this is an SR protocol data unit 140.

Length—The length of the source route information, in bytes. Zero is invalid, as is any odd number. The length field includes this routing control field.

Direction—This is set if the routes should be scanned in reverse order.

Largest—The largest frame allowed in this path. This is not needed for the forwarding of source route protocol data units.

The FPP 104 should set or zero the error bit for any source route protocol data unit 140 with an odd length. Following the routing control field, Length/2 route designators of the format shown in Table 31 should be present.

TABLE 31

| LAN ID | Bridge Number |
|---|---|
| 12 bits | 4 bits |

It should be noted that the byte order is Big Endian.

The following protocol information bits are defined for source route protocol data units.

Invalid Header

This bit is set if:

Length=0.

Length is odd.

Length>route information limit.

Duplicate LAN ID

This bit is set if either LAN ID was a duplicate.

Next LAN ID Unknown

This bit is set if the next LAN ID was not determined.

SRF

This bit is set if this is a Specifically Routed Frame (SRF) (the most significant bit of the routing control field is clear).

Source Route VFF Bit

The VFF bit is set for SRB protocol data units when:

The protocol data unit's header is valid.

The next LAN ID is known.

There are no duplicate LAN IDs in the route descriptors.

The protocol data unit 140 is a Specifically Routed Frame.

Once the source route length and direction have been determined from the routing control field, the FPP 104 should then use the following algorithm to determine the LAN ID for the next hop. The following per-port variables are used:

LID—LAN ID of the incoming port.

ILID—Internal LAN ID (zero if not set).

NLID—Next LAN ID

Bn—Bridge Number of the incoming port.

Bx—Any bridge number.

As a result the algorithm is as follows:

If ILID is non-zero,

If the direction bit is clear, look for the pattern LIDBn-ILIDBx-NLID.

If the direction bit is set, look for NLIDBx-ILIDBn-LID.

If ILID is not set,
 If the direction bit is clear, look for LIDBn-NLID.
 If the direction bit is set, look for NLIDBn-LID.
If ILID is non-zero, it can't be duplicated anywhere in the header.
NLID can't be duplicated anywhere in the header, either.
 If NLID was successfully determined, and no duplicate LAN IDs were found, the FPP 104 should then lookup up the CAM 128 entry as shown in Table 32.

TABLE 32

| Reserved | Domain Index | Reserved | SRB Lookup | Zero | Next LAN ID |
|---|---|---|---|---|---|
| 5 bits (zero) | 3 bits | 3 bits (zero) | 5 bits | 36 bits | 12 bits |

It should be noted that the domain index used for the port is the same as that for bridging and that it is used in place of the VR.

Some values need to be configured for the Source Route Bridge specific FPP 104 configuration. One value is a Source Routing Enabled per-port bit which indicates that source routing hardware is enabled for this port. If it is not, source route protocol data units are treated as MAC bridge protocol data units. Another value is a LAN ID to which the port is attached. If it is zero, next LAN ID lookups are not valid. The default is zero. A bridge number which is associated with the port is also needed. If it is zero, next LAN ID lookups are not valid. The default value is zero. An internal LAN ID of the the forwarding system 100 is also needed. If no internal LAb/ID is used, this should be zero, which is the default. Finally, a Route Info Size Limit per port value of 4 bits is needed. This represents the maximum size, in 16-bit words, of the length field in the source route control.

The following is a summary of the hardware configuration which is described above for each specific FPP 104 configuration. The following variables are configurable per board. All variables are one bit unless otherwise noted.
 General per-board variables:
  Enable/Disable Fast Packet Accelerator. This must not be modified after receives have been enabled on any port. Changing this requires a reset of the card.
  Minimum MTU Size (2 bits). The bits are assigned as follows:
   0—protocol data units with more than 64 words will set the min MTU exceeded flag. Software should use this value for min MTU of 250 or more bytes.
   1—128 words. Software uses this for min MTU of 506 or more bytes.
   2—192 words. For min MTU of 762 or more bytes.
   3—256 words. For min MTU of 1018 or more bytes. This is the largest min MTU supported by the FPP 104; protocol data unit 140 lengths greater than this value will always set the min MTU exceeded flag.
 DECnet per-board variables:
  Maximum Visit Count (8 bits)
 IPX per-board variables:
  Maximum Transport Control (4 bits)

In total, preferably 26 bits per board of configuration information are needed.
 The following variables are configurable per port. All variables are one bit unless otherwise noted.
 General per-port variables:
  Unicast Address (48 bits). Set in the CAM 128 at address (port number<<1), with a protocol type which is the same as transparent bridging), and the virtual router ID set up correctly for the port.
  Alternate Unicast Address (48 bits). Set in CAM 128 as with the Unicast address (port number<<1)+1.
  Virtual Router ID (3 bits)
  Enable/Disable Source Route Bridging
 IP per-port variables:
 Transparent Bridging per-port variables:
  Domain Index (3 bits)
 Table 33 describes the placement of the per-board and per-port configuration variables described above for the FDDI board. Note that the Virtual Router ID and Domain Index do not appear here. Since the FDDI FPP 104 supports only one port, these are assumed by the FPP 104 to be zero.

TABLE 33

| Rsvd | Min MTU | Max TC | Address | Rsvd | SRB Enable | CAM Lock | FPP Enable |
|---|---|---|---|---|---|---|---|
| Bits 15–14 | Bits 13–12 | Bits 11–8 | Bits 7–4 | Bit 3 | Bit 2 | Bit 1 | Bit 0 |

The FPP Enable, SRB Enable, Max Transport Control, and Minimum MTU fields are as described previously. The FDDI FPP 104 contains two extra fields:
 CAM Lock. This bit is used to control whether the user or the FPP 104 has access to the CAM 128. Software needing to read or write the CAM 128 must set this bit, then poll it until the FPP 128 says it's set. If the FPP 128 is currently processing a protocol data unit header, it will wait to set the bit when it's done, ensuring that the software will not interfere with the FPP's CAM 128 operations. If the FPP 104 starts to process a protocol data unit header while this bit is set, it simply marks the bridge/route status of the protocol data unit as "Other" and lets the software do the decoding.
 The Address field is used by the software during initialization, to handle some post-FPGA-load setup.

It should be noted that boards that do not support source route bridging acceleration (e.g., Ethernet) preferably will use 10 bits per port. In addition, boards supporting such bridging acceleration (e.g., Token Ring and FDDI) will use 42 bits per port. Also, a register should be provided to determine whether or not the FPP 104 is present, and if so, which version and type it is.

If the hardware implementation for these features consists of one or more FPGAs, programmable by software, multiple sets of FPGA code can exist for different boards or even different protocol mixes, in the case that not all protocols could be done at once.

It will be appreciated by those skilled in the art that other protocols could be detected without departing from the scope and spirit of the present invention, but additional information is probably not necessary to meet performance requirements. The following protocols could be considered for inclusion in the preferred embodiment forwarding system 100; however, this list is certainly not exhaustive.

XNS protocol data units could be handled as well, since they are mostly the same as IPX.

OSI Connectionless Network Protocol (CLNP) protocol data units use only the SAP encapsulation, with the DSAP=

0×FE. This protocol is potentially important, but is not yet supported.

Some other protocols, in no particular order, probably will not require sorting by the forwarding system 100 due to low performance requirements; however, these could be sorted just as a matter of convenience. These protocols include IP ARP, Apple ARP, Network Systems Corporation (NSC) Encapsulated Spanning Tree Protocol (STP), and Simple Network Architecture (SNA).

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A protocol data unit preprocessor for use in a protocol data unit forwarding device utilized in a communication network, the preprocessor comprising:
    (a) identification means for determining media header information of a protocol data unit received from over the communication network;
    (b) validation means, operatively coupled to the identification means, for validating the media header information; and
    (c) modification means, operatively coupled to the identification means, for adding next operation information to the media header information based upon the determined media header information, the next operation information including at least one encoded instruction to the protocol data unit forwarding device for accomplishing forwarding of the protocol data unit in the communication network such that subsequent processing of the protocol data unit by the protocol data unit forwarding device is reduced as compared to subsequent processing otherwise necessary for the protocol data unit forwarding device to forward the protocol data unit in the communication network without the next operation.

2. The protocol data unit preprocessor of claim 1 wherein:
    (a) the identification means comprises means for determining media header information selected from the group consisting of encapsulation type, protocol type, frame type, media destination, and source route information; and
    (b) the modification means comprises means for adding next operation information, selected from the group consisting of route, bridge, and source route bridge, to the media header information.

3. The protocol data unit preprocessor of claim 1 wherein the identification means comprises means for determining the media header information after having received only a portion of the protocol data unit.

4. The protocol data unit preprocessor of claim 1 wherein the validation means comprises means for performing a validation scheme selected from the group consisting of time-to-live, hop count, checksum, header type, header version, network header length, check options, source route header length, and check for duplicate local area network identifiers.

5. The protocol data unit preprocessor of claim 1 wherein the modification means comprises means for performing a protocol data unit modification based upon the next operation information which is selected from the group consisting of decrement time-to-live, increment hop count, modify checksum, truncate protocol data unit, and remove frame check sequence from the protocol data unit.

6. The protocol data unit preprocessor of claim 1 wherein the modification means comprises means for adding next operation information to the media header information after having received only a portion of the protocol data unit.

7. The protocol data unit preprocessor of claim 1 further comprising memory alignment means, operatively coupled to the identification means, for adding pad bytes of data to the protocol data unit such that the header information is aligned on optimal boundaries.

8. The protocol data unit preprocessor of claim 1 further comprising address lookup means, operatively coupled to the identification means, for obtaining an address according to a processor-implemented function selected from the group consisting of:
    (a) comparing a network destination address of the protocol data unit to a predetermined list of known network destination addresses;
    (b) comparing a media destination address of the protocol data unit to a predetermined list of known media destination addresses;
    (c) comparing a media source address of the protocol data unit to a predetermined list of known media destination addresses; and
    (d) comparing a media source address of the protocol data unit to a predetermined list of known media source addresses.

9. The protocol data unit preprocessor of claim 1 further comprising source route bridge destination lookup means, operatively coupled to the identification means, for checking for specifically routed protocol data unit, finding next local area network identifier in a source route of the protocol data unit, and comparing the next local area network identifier to a predetermined list of known local area network identifiers.

10. The protocol data unit preprocessor of claim 1 wherein:
    (a) the protocol data unit forwarding device is selected from the group consisting of a bridge, a router, a switch, an inline filter, a protocol converter, an encapsulating device, and a security device;
    (b) the protocol data unit is selected from the group consisting of a frame, a cell, and a packet;
    (c) the communication network is selected from the group consisting of local protocol data unit source device, local area network, wide area network, metropolitan area network, and wireless network; and
    (d) the communication network transfers protocol data units having a content selected from the group consisting of voice, video, and data.

11. The protocol data unit preprocessor of claim 10 further comprising address lookup means, operatively coupled to the protocol data unit preprocessor means, for obtaining an address according to a processor-implemented function selected from the group consisting of:
    (a) comparing a network destination address of the protocol data unit to a predetermined list of known network destination addresses;
    (b) comparing a media destination address of the protocol data unit to a predetermined list of known media destination addresses;
    (c) comparing a media source address of the protocol data unit to a predetermined list of known media destination addresses; and
    (d) comparing a media source address of the protocol data unit to a predetermined list of known media source addresses.

12. The protocol data unit preprocessor of claim 1 further comprising receiving means, operatively coupled to the preprocessor, for receiving the protocol data unit from the communication network.

13. The protocol data unit preprocessor of claim 1 further comprising transmitting means, operatively coupled to the preprocessor, for transmitting the subsequently processed protocol data unit over the communication network.

14. A protocol data unit forwarding device for use in a communication network to transfer protocol data units within the communication network, comprising:
   (a) protocol data unit processor, comprising:
      (i) identification means for determining media header information of a protocol data unit which is received from over the communication network;
      (ii) validation means, operatively coupled to the identification means, for validating the media header information; and
      (iii) modification means, operatively coupled to the identification means, for adding next operation information to the media header information based upon the determined media header information; and
   (b) forwarding processor, operatively coupled to the protocol data unit preprocessor, for forwarding the protocol data unit in the communication network based upon the next operation information.

15. The protocol data unit forwarding device of claim 14 wherein:
   (a) the identification means comprises means for determining media header information selected from the group consisting of encapsulation type, protocol type, frame type, media destination, and source route information; and
   (b) the protocol data unit preprocessor modification means comprises means for adding next operation information, selected from the group consisting of route, bridge, and source route bridge, to the media header information.

16. The protocol data unit forwarding device of claim 14 wherein the protocol data unit preprocessor validation means comprises means for performing a validation scheme selected from the group consisting of time to live, hop count, checksum, header type, header version, network header length, check options, source route header length, and check for duplicate local area network identifiers.

17. The protocol data unit forwarding device of claim 14 wherein the protocol data unit preprocessor modification means comprises means for performing a protocol data unit modification, prior to the forwarding processor forwarding the protocol data unit, based upon the next operation information which is selected from the group consisting of decrement time-to-live, increment hop count, modify checksum, truncate protocol data unit, and remove frame check sequence from the protocol data unit.

18. The protocol data unit forwarding device of claim 14 further comprising memory alignment means, operatively coupled to the protocol data unit preprocessor identification means, for adding pad bytes of data to the protocol data unit such that the header information is aligned on optimal boundaries.

19. The protocol data unit forwarding device of claim 14 further comprising address lookup means, operatively coupled to the protocol data unit preprocessor identification means, for obtaining an address according to a processor-implemented function selected from the group consisting of:
   (a) comparing a network destination address of the protocol data unit to a predetermined list of known network destination addresses;
   (b) comparing a media destination address of the protocol data unit to a predetermined list of known media destination addresses;
   (c) comparing a media source address of the protocol data unit to a predetermined list of known media destination addresses; and
   (d) comparing a media source address of the protocol data unit to a predetermined list of known media source addresses.

20. The protocol data unit forwarding device of claim 14 further comprising source route bridge destination lookup means, operatively coupled to the protocol data unit preprocessor identification means, for checking for specifically routed protocol data unit, finding next local area network identifier in a source route of the protocol data unit, and comparing the next local area network identifier to a predetermined list of known local area network identifiers.

21. The protocol data unit forwarding device of claim 14 further comprising receiving means, operatively coupled to the preprocessor, for receiving the protocol data unit from the communication network, the communication network being selected from the group consisting of a local protocol data unit source device, a local area network, a wide area network, a metropolitan area network, and a wireless network.

22. The protocol data unit forwarding device of claim 14 further comprising transmitting means, operatively coupled to the forwarding processor, for transmitting the protocol data unit based upon the next operation information over the communication network, the communication network being selected from the group consisting of a local protocol data unit source device, a local area network, a wide area network, a metropolitan area network, and a wireless network.

23. A method of operating a forwarding device within a communication network to forward a protocol data unit received by the forwarding device, the method comprising the device-implemented steps of:
   (a) in a first processor, performing the steps of:
      (a)(i) determining media header information of a protocol data unit based upon a portion of the protocol data unit which is received from over a communication network;
      (a)(ii) validating the media header information; and
      (a)(iii) adding next operation information to the media header information based upon the determined media header information; and
   (b) in a second processor, forwarding the protocol data unit in the communication network based upon the next operation information.

24. The method of claim 23 wherein the step of adding next operation information to the media header information comprises designating a particular next operation selected from the group consisting of route, bridge, and source route bridge, the particular next operation being based upon media header information selected from the group consisting of a frame type, a media destination type, and source route information.

25. The method of claim 23 wherein the step of validating comprises performing a validation scheme selected from the group consisting of time to live, hop count, checksum, header type, header version, network header length, check options, source route header length, and check for duplicate local area network identifiers.

26. The method of claim 23 further comprising a step, prior to the step of forwarding the protocol data unit, of modifying the protocol data unit in accordance with next operation information, the modification being selected from the group consisting of decrement time-to-live, increment hop count, modify checksum, truncate protocol data unit, and remove frame check sequence from the protocol data unit.

27. The method of claim 23 further comprising the step adding pad bytes of data to the protocol data unit such that the header information is aligned on optimal boundaries.

28. The method of claim 23 further comprising the step of obtaining an address according to a step selected from the group consisting of:

(a) comparing a network destination address of the protocol data unit to a predetermined list of known network destination addresses;

(b) comparing a media destination address of the protocol data unit to a predetermined list of known media destination addresses;

(c) comparing a media source address of the protocol data unit to a predetermined list of known media destination addresses; and (d) comparing a media source address of the protocol data unit to a predetermined list of known media source addresses.

29. The method of claim 23 further comprising the steps of checking for a specifically routed protocol data unit, finding next local area network identifier in a source route of the protocol data unit, and comparing the next local area network identifier to a predetermined list of known local area network identifiers.

* * * * *